(12) United States Patent
Kondo et al.

(10) Patent No.: US 9,484,819 B2
(45) Date of Patent: *Nov. 1, 2016

(54) REGULATOR DEVICE

(71) Applicant: FUJITSU LIMITED, Kawasaki-shi, Kanagawa (JP)

(72) Inventors: Katsutoshi Kondo, Funabashi (JP); Kazunori Kasuga, Yokohama (JP); Hirofumi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1039 days.

This patent is subject to a terminal disclaimer.

(21) Appl. No.: 13/632,359

(22) Filed: Oct. 1, 2012

(65) Prior Publication Data

US 2013/0093251 A1 Apr. 18, 2013

(30) Foreign Application Priority Data

Oct. 14, 2011 (JP) .................................. 2011-227415

(51) Int. Cl.
*H02J 1/10* (2006.01)
*H02M 3/158* (2006.01)
*H02M 1/00* (2006.01)

(52) U.S. Cl.
CPC ..... *H02M 3/1584* (2013.01); *H02M 2001/008* (2013.01); *H02M 2001/009* (2013.01); *H02M 2001/0032* (2013.01); *Y02B 70/16* (2013.01); *Y10T 307/707* (2015.04)

(58) Field of Classification Search
None
See application file for complete search history.

(56) References Cited

U.S. PATENT DOCUMENTS

| 4,257,090 A * | 3/1981 | Kroger | H02M 3/1584 323/222 |
| 6,281,666 B1 * | 8/2001 | Tressler | H02M 3/1584 323/272 |
| 7,221,129 B2 * | 5/2007 | Matsuo | H02M 3/158 323/222 |

(Continued)

FOREIGN PATENT DOCUMENTS

| CN | 1691481 A | 11/2005 |
| EP | 0949739 A2 | 10/1999 |

(Continued)

OTHER PUBLICATIONS

Chinese Office Action issued Jun. 25, 2014 in corresponding Chinese Patent Application No. 201210384140.4.

(Continued)

*Primary Examiner* — Jared Fureman
*Assistant Examiner* — Joel Barnett
(74) *Attorney, Agent, or Firm* — Staas & Halsey LLP

(57) ABSTRACT

A regulator device includes: a plurality of regulators that are equipped in parallel between a power input terminal and a power output terminal and converts a power inputted from the power input terminal to output to the power output terminal; a dummy load circuit that is coupled to a power output system different from a power output system to the respective power output terminal of the plurality of regulators; a selector that selects a regulator to carry out an output to the power output terminal and a regulator to carry out an output to the dummy load circuit among the plurality of regulators; and a controller that obtains conversion efficiency characteristic information representing a characteristic of power conversion efficiency relative to a current flowing in the dummy load circuit for the regulator to carry out an output to the dummy load circuit.

12 Claims, 34 Drawing Sheets

(56) References Cited

U.S. PATENT DOCUMENTS

| | | | |
|---|---|---|---|
| 8,680,826 B2* | 3/2014 | Kondo | H02M 3/1584 323/272 |
| 2005/0258811 A1 | 11/2005 | Matsuo et al. | |
| 2008/0294916 A1 | 11/2008 | Moussaoui | |
| 2009/0153111 A1 | 6/2009 | Mao et al. | |
| 2009/0179619 A1 | 7/2009 | Houston | |
| 2009/0278517 A1 | 11/2009 | Kleveland | |
| 2011/0080143 A1* | 4/2011 | Parakulam | H02M 3/1582 320/162 |
| 2011/0289335 A1 | 11/2011 | Lipiansky et al. | |
| 2011/0309811 A1 | 12/2011 | Kondo et al. | |

FOREIGN PATENT DOCUMENTS

| | | |
|---|---|---|
| JP | 11-353040 | 12/1999 |
| JP | 2008-283827 | 11/2008 |

OTHER PUBLICATIONS

Notice of Allowance mailed Nov. 27, 2013 in U.S. Appl. No. 13/163,908 (now U.S. Pat. No. 8,680,826).

* cited by examiner

FIG. 7

| D7 | D6 | D5 | D4 | D3 | D2 | D1 | D0 |
|----|----|----|----|----|----|----|----|
| START-UP REGULATOR || UNUSED ||||||

FIG. 8

| D7 | D6 | START-UP REGULATOR (No.) |
|---|---|---|
| 0 | 0 | 1 |
| 0 | 1 | 2 |
| 1 | 0 | 3 |
| 1 | 1 | 4 |

FIG. 9

| D23 | D22 | D21 | D20 | D19 | D18 | D17 | D16 |
|---|---|---|---|---|---|---|---|
| UNUSED |||| OUTPUT CURRENT ||||
| D15 | D14 | D13 | D12 | D11 | D10 | D9 | D8 |
| SELECTED REGULATOR || SELECTION EFFICIENCY ||||||
| D7 | D6 | D5 | D4 | D3 | D2 | D1 | D0 |
| MEASUREMENT REGULATOR || MEASUREMENT EFFICIENCY ||||||

FIG. 10

| D19 | D18 | D17 | D16 | OUTPUT CURRENT (A) |
|-----|-----|-----|-----|--------------------|
| 0   | 0   | 0   | 0   | 0                  |
| 0   | 0   | 0   | 1   | 1                  |
| 0   | 0   | 1   | 0   | 2                  |
| 0   | 0   | 1   | 1   | 3                  |
|     |     |     |     |                    |
| 1   | 1   | 1   | 1   | 15                 |

FIG. 11

| D15/D7 | D14/D6 | SELECTED REGULATOR (No.) |
|---|---|---|
| 0 | 0 | 1 |
| 0 | 1 | 2 |
| 1 | 0 | 3 |
| 1 | 1 | 4 |

FIG. 12

| D13/D5 | D12/D4 | D11/D3 | D10/D2 | D9/D1 | D8/D0 | EFFICIENCY (%) |
|---|---|---|---|---|---|---|
| 0 | 0 | 0 | 0 | 0 | 0 | 37 |
| 0 | 0 | 0 | 0 | 0 | 1 | 38 |
| 0 | 0 | 0 | 0 | 1 | 0 | 39 |
| 0 | 0 | 0 | 0 | 1 | 1 | 40 |
|   |   |   |   |   |   |   |
| 1 | 1 | 1 | 1 | 1 | 1 | 100 |

FIG. 14

| D23 | D22 | D21 | D20 | D19 | D18 | D17 | D16 |
|---|---|---|---|---|---|---|---|
| TEMPERATURE | | | | OUTPUT CURRENT | | | |
| D15 | D14 | D13 | D12 | D11 | D10 | D9 | D8 |
| SELECTED REGULATOR | | SELECTION EFFICIENCY | | | | | |
| D7 | D6 | D5 | D4 | D3 | D2 | D1 | D0 |
| MEASUREMENT REGULATOR | | MEASUREMENT EFFICIENCY | | | | | |

FIG. 15

| D23 | D22 | D21 | D20 | TEMPERATURE (°C) |
|---|---|---|---|---|
| 0 | 0 | 0 | 0 | 10 |
| 0 | 0 | 0 | 1 | 15 |
| 0 | 0 | 1 | 0 | 20 |
| 0 | 0 | 1 | 1 | 25 |
|  |  |  |  |  |
| 1 | 1 | 1 | 1 | 85 |

FIG. 16

| D39 | D38 | D37 | D36 | D35 | D34 | D33 | D32 |
|---|---|---|---|---|---|---|---|
| UNUSED | | | | AVERAGE OPERATING TEMPERATURE | | | |
| D31 | D30 | D29 | D28 | D27 | D26 | D25 | D24 |
| OPERATING TIME | | | | | | | |

FIG. 17

| D35 | D34 | D33 | D32 | AVERAGE OPERATING TEMPERATURE (°C) |
|---|---|---|---|---|
| 0 | 0 | 0 | 0 | 10 |
| 0 | 0 | 0 | 1 | 15 |
| 0 | 0 | 1 | 0 | 20 |
| 0 | 0 | 1 | 1 | 25 |
|   |   |   |   |   |
| 1 | 1 | 1 | 1 | 85 |

FIG. 21

| D7 | D6 | D5 | D4 | D3 | D2 | D1 | D0 |
|----|----|----|----|----|----|----|----|
| WARNING REGISTER |||| UNUSED ||||

FIG. 22

| D7 | D6 | D5 | D4 | ABNORMAL REGULATOR (No.) |
|----|----|----|----|--------------------------|
| 0  | 0  | 0  | 0  | NO ABNORMAL REGULATOR    |
| 0  | 0  | 0  | 1  | REGULATOR 1 ABNORMAL     |
| 0  | 0  | 1  | 0  | REGULATOR 2 ABNORMAL     |
|    |    |    |    |                          |
| 0  | 1  | 0  | 0  | REGULATOR 3 ABNORMAL     |
| 1  | 0  | 0  | 0  | REGULATOR 4 ABNORMAL     |

FIG. 26

| D7 | D6 | D5 | D4 | D3 | D2 | D1 | D0 |
|----|----|----|----|----|----|----|----|
| UNUSED | | | | BUSY REGISTER | | | |

FIG. 27

| D3 | D2 | D1 | D0 | BUSY REGULATOR (No.) |
|----|----|----|----|----------------------|
| 0 | 0 | 0 | 0 | NO BUSY REGULATOR |
| 0 | 0 | 0 | 1 | REGULATOR 1 BUSY |
| 0 | 0 | 1 | 0 | REGULATOR 2 BUSY |
| 0 | 1 | 0 | 0 | REGULATOR 3 BUSY |
| 1 | 0 | 0 | 0 | REGULATOR 4 BUSY |

FIG. 31

| COMMAND CODE | COMMAND NAME |
|---|---|
| ACh | EFFICIENCY_Measurement |
| ADh | READ_EFFICIENCY |

FIG. 33

| COMMAND CODE | COMMAND NAME |
|---|---|
| 8Ch | READ_IOUT |
| 89h | READ_IIN |

FIG. 34

| COMMAND CODE | COMMAND NAME |
|---|---|
| 96h | READ_POUT |
| 97h | READ_PIN |

REGULATOR DEVICE

CROSS-REFERENCE TO RELATED APPLICATION

This application is based upon and claims the benefit of priority of the prior Japanese Patent Application No. 2011-227415, filed on Oct. 14, 2011, the entire contents of which are incorporated herein by reference.

FIELD

The embodiments discussed herein are related to a regulator device.

BACKGROUND

Conventionally, for wireless communication machines, such as mobile phones, or information processing machines, such as PCs (personal computers) and servers, a regulator for power conversion is used that converts an input power into a desired output power.

Wireless communication machines and information processing machines in recent years tend to have an increasing peak of a load current as they become enhanced in performances and functions, while there is a demand for stable supply of power over a long period of time by reducing power consumption. Therefore, it is important to use a regulator with high power conversion efficiency.

In the meanwhile, there are various types of regulators depending on the differences in, for example, the rated current or the rated voltage, and the characteristics of the power conversion efficiency relative to the output current value differ with the type of a regulator.

For example, even in a case of items in an identical series having an equivalent internal circuit only different in a rated current value, the regulators sometimes differ in the characteristics of the power conversion efficiency. In this case, when selecting a high power regulator in conformity with the peak load current, the power conversion efficiency of the high power regulator sometimes become worse under low load compared with the power conversion efficiency of a low power regulator.

With that, there is a regulator device that is equipped with a plurality of regulators with different power conversion efficiency and selectively switches to a regulator with optimum power conversion efficiency in accordance with the output current value.

The following is reference document:
[Document 1] Japanese Laid-open Patent Publication No. 11-353040

SUMMARY

According to an aspect of the invention, a regulator device includes: a plurality of regulators that are equipped in parallel between a power input terminal and a power output terminal and converts a power inputted from the power input terminal to output to the power output terminal; a dummy load circuit that is coupled to a power output system different from a power output system to the respective power output terminal of the plurality of regulators; a selector that selects a regulator to carry out an output to the power output terminal and a regulator to carry out an output to the dummy load circuit among the plurality of regulators; and a controller that obtains conversion efficiency characteristic information representing a characteristic of power conversion efficiency relative to a current flowing in the dummy load circuit for the regulator to carry out an output to the dummy load circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a chart illustrating an example of a register configuration;

FIG. 8 is a chart illustrating an example of a register configuration of a start-up regulator;

FIG. 9 is a chart illustrating an example of a register configuration;

FIG. 10 is a chart illustrating an example of a configuration of an output current register;

FIG. 11 is a chart illustrating an example of register configurations of selection/measurement regulators;

FIG. 12 is a chart illustrating an example of register configurations of selection efficiency/measurement efficiency;

FIG. 14 is a chart illustrating an example of a register configuration;

FIG. 15 is a chart illustrating an example of configurations of a temperature register;

FIG. 16 is a chart illustrating an example of a register configuration;

FIG. 17 is a chart illustrating an example of configurations of an average operating temperature register;

FIG. 21 is a chart illustrating an example of a register configuration;

FIG. 22 is a chart illustrating an example of a configuration of warning registers;

FIG. 26 is a chart illustrating an example of a register configuration;

FIG. 27 is a chart illustrating an example of a configuration of BUSY registers;

FIG. 31 is a chart illustrating an example of PM-Bus commands;

FIG. 33 is a chart illustrating an example of PM-Bus commands; and

FIG. 34 is a chart illustrating an example of PM-Bus commands.

DESCRIPTION OF EMBODIMENTS

A detailed description is given below to embodiments of a regulator device disclosed herein based on the drawings. The embodiments do not limit disclosed techniques. In the embodiments below, a description is given on the assumption of a regulator device equipped with a wireless communication machine, such as a mobile phone, or an information processing machine, such as a PC and a server, while it is applicable to electronics using electric power not limited to the wireless communication machines or the information processing machines.

[First Embodiment]

Figure 1:
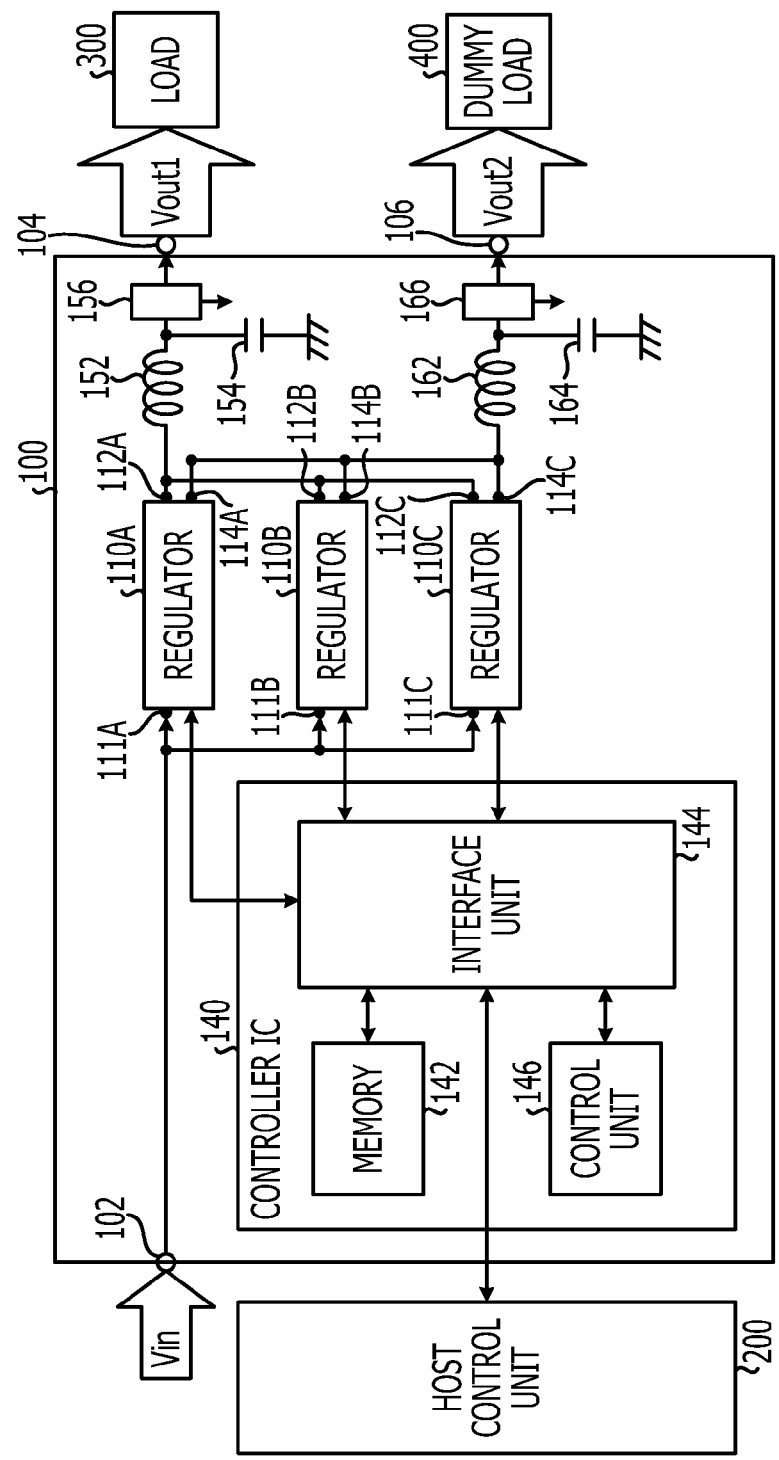
FIG. 1 is a block diagram illustrating a configuration of a regulator device.

Firstly, a description is given to a regulator device in First Embodiment. FIG. 1 is a block diagram illustrating a configuration of a regulator device. As illustrated in FIG. 1, a regulator device 100 is provided with a power input terminal 102, a first power output terminal 104, a second power output terminal 106, a plurality (three) of regulators 110A, 110B, and 110C, and a controller IC (integrated circuit) 140. The regulator device 100 is also provided with coils 152 and 162, capacitors 154 and 164, ammeters 156 and 166, and a dummy load 400.

The power input terminal 102 is a terminal to which a voltage (Vin) supplied from outside the regulator device 100 is applied. To the power input terminal 102, a direct current voltage of, for example, 5 to 12 (V) is applied. The direct current voltage applied to the power input terminal 102 is converted (raised or lowered in pressure) to a direct current voltage at a predetermined voltage in the regulator device 100 to be outputted from the first power output terminal 104 or the second power output terminal 106.

The first power output terminal 104 is a terminal that supplies a voltage (Vout1) converted by the regulator device 100 to a load 300 of a wireless communication machine or an information processing machine. The second power output terminal 106 is a terminal that supplies a power (Vout2) converted by the regulator device 100 to the dummy load 400 equipped to measure characteristics of power conversion efficiency relative to output currents of the regulators 110A, 110B, and 110C. The load 300 indicates various types of components and circuits equipped in the wireless communication machine or the information processing machine and supplied with a power from the regulator device 100. The dummy load 400 is a load to measure characteristics of power conversion efficiency relative to the output currents of the regulators 110A, 110B, and 110C, and is a load having a variable resistance value to enable a current value flowing in the dummy load 400 to be variable. The dummy load 400 is connected to a power output system different from respective power output systems to the first power output terminal 104 of the plurality of regulators 110A, 110B, and 110C.

The regulators 110A, 110B, and 110C are connected in parallel between the power input terminal 102 and the first power output terminal 104. The regulators 110A, 110B, and 110C have, respectively, input units 111A, 111B, and 111C, first output terminals 112A, 112B, and 112C, and second output terminals 114A, 114B, and 114C. The input units 111A, 111B, and 111C are connected to the power input terminal 102. The first output terminals 112A, 112B, and 112C are connected to one end of the coil 152. In contrast, the second output terminals 114A, 114B, and 114C are connected to one end of the coil 162.

The regulators 110A, 110B, and 110C respectively store conversion efficiency characteristic information indicating the characteristics of the power conversion efficiency relative to the output current of the own regulator in a memory equipped in the own regulator. The regulators 110A, 110B, and 110C are regulators respectively with different power conversion efficiency relative to the output current, while they have a basically identical internal structure. The details of the internal structure of the regulators 110A, 110B, and 110C are described later using FIG. 4. In the description below, in a case that the regulators 110A, 110B, and 110C are not particularly distinguished, they are referred to as regulators 110.

The coil 152 has one end connected to the first output terminals 112A, 112B, and 112C of the regulators 110A, 110B, and 110C and the other end connected to the first power output terminal 104 via the ammeter 156. The coil 152 is equipped to generate an induced electromotive force for power conversion accompanied by turning on/off of a switching element in the regulators 110A, 110B, and 110C.

The coil 162 has one end connected to the second output terminals 114A, 114B, and 114C of the regulators 110A, 110B, and 110C and the other end connected to the second power output terminal 106 via the ammeter 166. The coil 162 is equipped to generate an induced electromotive force for power conversion accompanied by turning on/off of a switching element in the regulators 110A, 110B, and 110C.

The capacitor 154 is a capacitor for smoothing having one end, connected between the other end of the coil 152 and the ammeter 156, and the other end being grounded. The capacitor 154 is equipped to smooth the voltage outputted from the first power output terminal 104.

The capacitor 164 is a capacitor for smoothing having one end, connected between the other end of the coil 162 and the ammeter 166, and the other end being grounded. The capacitor 164 is equipped to smooth the voltage outputted from the second power output terminal 106.

The ammeter 156 is a current sensor equipped between the other end of the coil 152 and the first power output terminal 104 to detect a current value flowing to the load 300. The ammeter 166 is a current sensor equipped between the other end of the coil 162 and the second power output terminal 106 to detect a current value flowing to the dummy load 400.

The controller IC 140 is provided with a memory 142, an interface unit 144, and a control unit 146, and has functions of monitoring, managing, and controlling the regulators 110A, 110B, and 110C. The memory 142 is a storage unit to store various types of data used for the controller IC 140. The memory 142 is connected to the interface unit 144.

The interface unit 144 is connected respectively to the regulators 110A, 110B, and 110C to carry out data input/output process to and from the regulators 110A, 110B, and 110C. For example, the interface unit 144 reads out the conversion efficiency characteristic information stored in a memory in the regulators 110A, 110B, and 110C. For the connection between the interface unit 144 and the regulators 110A, 110B, and 110C, an interface, such as PM-Bus (power management bus), for example, may be used.

The interface unit 144 stores the conversion efficiency characteristic information read out from the regulators 110A, 110B, and 110C in the memory 142. To the interface unit 144, the current value metered by the ammeters 156 and 166 is inputted. The interface unit 144 is connected to a host control unit 200 equipped outside the regulator device 100 to carry out data input/output process to and from the host control unit 200. The internal structure of the host control unit 200 is described later using FIG. 5.

The control unit 146 selects a regulator to carry out an output to the first power output terminal 104 and a regulator to carry out an output to the dummy load 400 among the plurality of regulators 110A, 110B, and 110C. For example, the control unit 146 selects a regulator to carry out an output from the first power output terminal 104 based on the current value metered by the ammeter 156 and the conversion efficiency characteristic information of each of the regulators 110A, 110B, and 110C stored in the memory 142. More specifically, the control unit 146 selects a regulator with highest power conversion efficiency relative to the current value metered by the ammeter 156 as a regulator to carry out an output from the first power output terminal 104 among the regulators 110A, 110B, and 110C. The control unit 146 selects a regulator to carry out an output to the dummy load 400 among the regulators other than the regulator selected as the regulator to carry out an output from the first power output terminal 104 out of the plurality of regulators 110A, 110B, and 110C.

Figure 2:
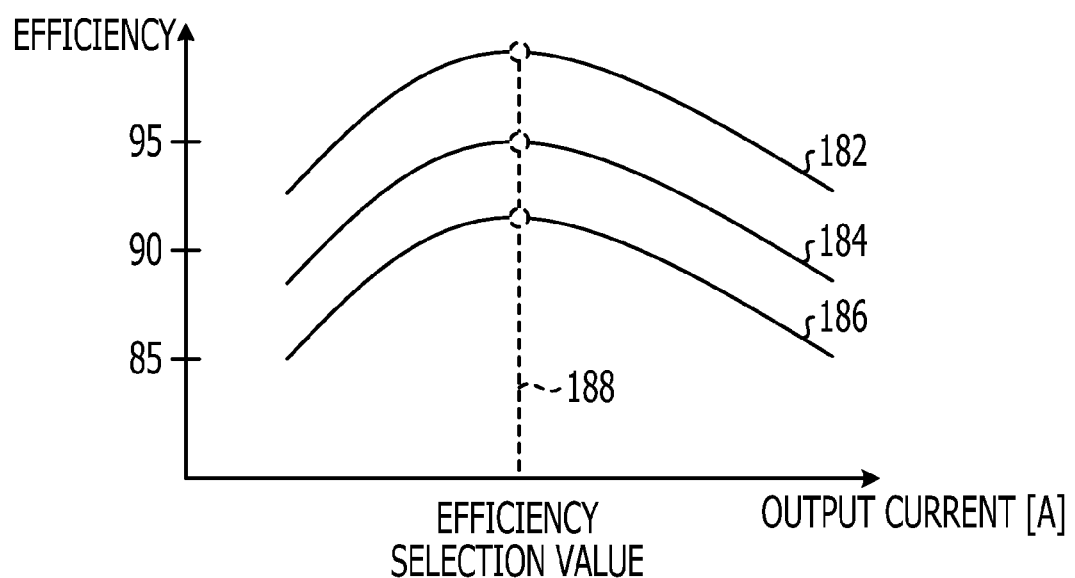
FIG. 2 is a chart illustrating an example of regulator efficiency characteristic mapping with different power conversion efficiency characteristics.
Figure 3:
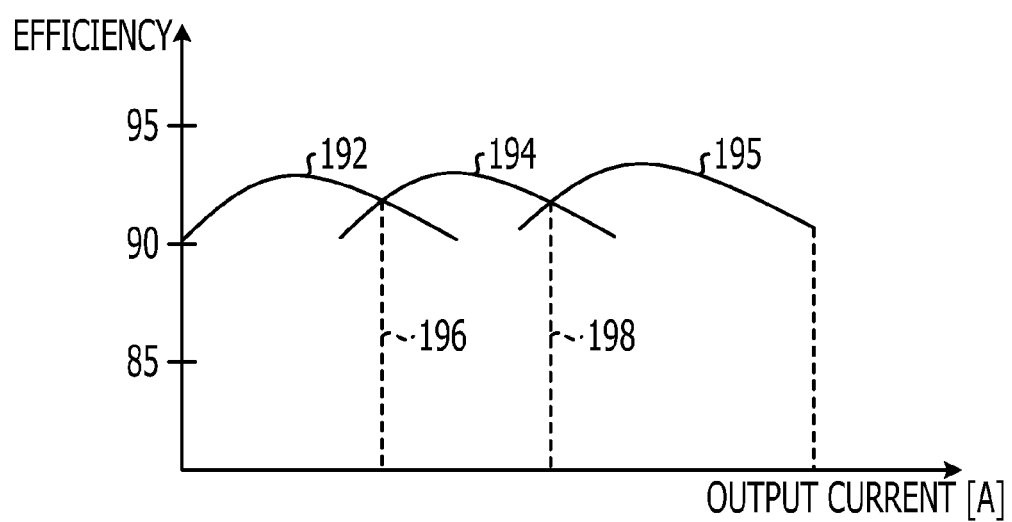
FIG. 3 is a chart illustrating an example of mapping of regulator efficiency characteristics with different output capacities.

Here, a description is given to the selection of a regulator in the control unit 146. FIG. 2 is a chart illustrating an example of regulator efficiency characteristic mapping with different power conversion efficiency characteristics. FIG. 3 is a chart illustrating an example of mapping of regulator efficiency characteristics with different output capacities.

In FIGS. 2 and 3, abscissas of the graphs represent the output current of the regulators, and ordinates of the graphs represent the power conversion efficiency. FIG. 2 represents characteristics of power conversion efficiency of three regulators 182, 184, and 186 with an equivalent rated current and different power conversion efficiency. FIG. 3 represents characteristics of power conversion efficiency of three regulators 192, 194, and 195 with different rated currents.

As illustrated in FIG. 2, it is assumed that, for example, the current value metered by the ammeter 156 is a current value 188. In this case, the control unit 146 reads out the power conversion efficiency of the regulators 182, 184, and 186 at the current value 188 from the memory 142. The control unit 146 compares the magnitude of the power conversion efficiency of the regulators 182, 184, and 186 at the current value 188. In this example, since the power conversion efficiency of the regulator 182 is largest, the control unit 146 selects the regulator 182 as the regulator to carry out an output from the first power output terminal 104 (regulator to carry out an output to the load 300).

As illustrated in FIG. 3, in a case that, for example, the current value metered by the ammeter 156 is less than a current value 196, the power conversion efficiency of the regulator 192 is largest, so that the control unit 146 selects the regulator 192 as the regulator to carry out an output from the first power output terminal 104. In a case that the current value metered by the ammeter 156 is not less than the current value 196 and is less than a current value 198, the power conversion efficiency of the regulator 194 is largest, so that the control unit 146 selects the regulator 194 as the regulator to carry out an output from the first power output terminal 104. In a case that the current value metered by the ammeter 156 is not less than the current value 198, the power conversion efficiency of the regulator 195 is largest, so that the control unit 146 selects the regulator 195 as the regulator to carry out an output from the first power output terminal 104.

Figure 4:
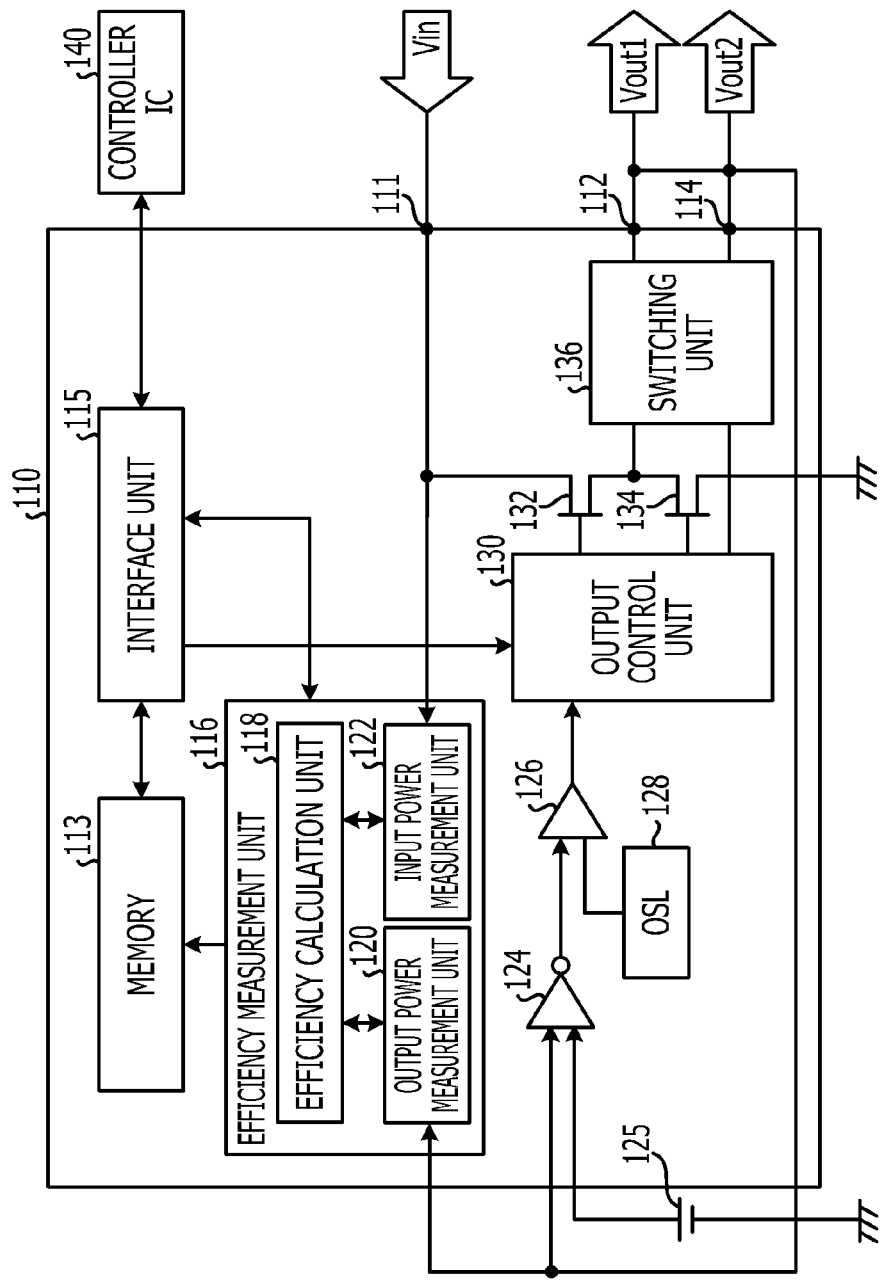
FIG. 4 is a block diagram illustrating a configuration of a regulator.

Next, a description is given to a configuration of the regulators 110A, 110B, and 110C in First Embodiment. FIG. 4 is a block diagram illustrating a configuration of a regulator. As illustrated in FIG. 4, the regulator 110 is provided with the input unit 111, the first output terminal 112, the second output terminal 114, a memory 113, an interface unit 115, and an efficiency measurement unit 116. The regulator 110 is also provided with an error amplifier 124, a comparator 126, an oscillator 128, an output control unit 130, FETs (field effect transistors) 132 and 134, and a switching unit 136.

The input unit 111 is connected to the power input terminal 102 of the regulator device 100, and the power supplied to the wireless communication machine or the information processing machine in which the regulator device 100 is incorporated is inputted thereto. For example, to the input unit 111, a direct current voltage of 5 to 12 (V) is applied.

The first output terminal 112 is connected to the first power output terminal 104 of the regulator device 100 to output the direct current voltage converted in the regulator 110 to the first power output terminal 104. The second output terminal 114 is connected to the second power output terminal 106 of the regulator device 100 to output the direct current voltage converted in the regulator 110 to the second power output terminal 106.

The memory 113 is a storage unit to have the conversion efficiency characteristic information indicating the characteristics of the power conversion efficiency relative to the output current of the regulator 110 calculated by the efficiency measurement unit 116 stored therein. The memory 113 may be, for example, a volatile memory temporarily holding the conversion efficiency characteristic information and may also be a non-volatile memory.

The interface unit 115 is connected to the controller IC 140 to carry out data input/output process to and from the interface unit 115 in the controller IC 140. For example, the interface unit 115 sends the conversion efficiency characteristic information stored in the memory 113 to the controller IC 140. In addition, for example, the interface unit 115 outputs a signal of an output switching instruction sent from the controller IC 140 to the output control unit 130.

The efficiency measurement unit 116 is provided with an efficiency calculation unit 118, an output power measurement unit 120, and an input power measurement unit 122. The input power measurement unit 122 is connected to the input unit 111 to measure a power at the input unit 111. The output power measurement unit 120 is connected to the second output terminal 114 to measure a power at the second output terminal 114.

The efficiency calculation unit 118 is achieved by, for example, a CPU (central processing unit), and obtains the power conversion efficiency by obtaining a ratio of an output power metered by the output power measurement unit 120 to the input power measured by the input power measurement unit 122. The efficiency calculation unit 118 also obtains the characteristics of the power conversion efficiency in accordance with the current value flowing to the dummy load 400. The conversion efficiency characteristic information representing the characteristics of the power conversion efficiency obtained by the efficiency calculation unit 118 is stored in the memory 113. The conversion efficiency characteristic information obtained by the efficiency calculation unit 118 may also be sent to the controller IC 140 via the interface unit 115 to be stored in the memory 142, without being stored in the memory 113.

The FET 132 is a switching element to carry out control for turning on/off by the output control unit 130, and may use, for example, a P-type MOSFET (metal oxide semiconductor field effect transistor). The FET 134 is a switching element to carry out control for turning on/off by the output control unit 130, and may use, for example, an N-type MOSFET.

The FETs 132 and 134 have their drain terminals connected to each other, the FET 132 has a source connected to the input unit 111, and the FET 134 has a source being grounded. The FETs 132 and 134 have respective gates connected to the output control unit 130 to carry out control for turning on/off of the FETs 132 and 134 by a driving signal outputted from the output control unit 130.

The output control unit 130 carries out control for turning on/off of the FETs 132 and 134 by sending the driving signal to the FETs 132 and 134 to carry out process of converting the input power to a desired output power. The output control unit 130 also sends a switching signal to the switching unit 136. The switching signal is a signal to instruct switching between outputting the power converted by the regulator 110 from the first output terminal 112, outputting it from the second output terminal 114, or not outputting it from either the first output terminal 112 or the second output terminal 114.

To the switching unit 136, an output power outputted from drain terminals of the FETs 132 and 134 is inputted. To the switching unit 136, the switching signal outputted from the output control unit 130 is also inputted. The switching unit 136 carries out the switching, based on the switching signal, between outputting the output power from the first output terminal 112, outputting it from the second output terminal 114, or not outputting it from either the first output terminal 112 or the second output terminal 114. This controls the regulator 110 in any status of operating the wireless communication machine or the information processing machine by supplying a power to the load 300, measuring the characteristics of the power conversion efficiency by supplying a power to the dummy load 400, or not carrying out an output of a power.

To the error amplifier 124, an output voltage outputted from the first output terminal 112 or the second output terminal 114 is inputted and also a reference voltage outputted from a power supply 125 for the reference voltage is inputted to output a difference between the output voltage and the reference voltage by amplifying it.

To the comparator 126, an error voltage outputted from the error amplifier 124 and a pulse voltage outputted from the oscillator 128 are inputted. The comparator 126 captures the error voltage at a predetermined timing determined by the pulse voltage to input it to the output control unit 130. As a result, driving control of the FETs 132 and 134 is carried out by the output control unit 130 and the input power is converted to a predetermined output power.

Figure 5:
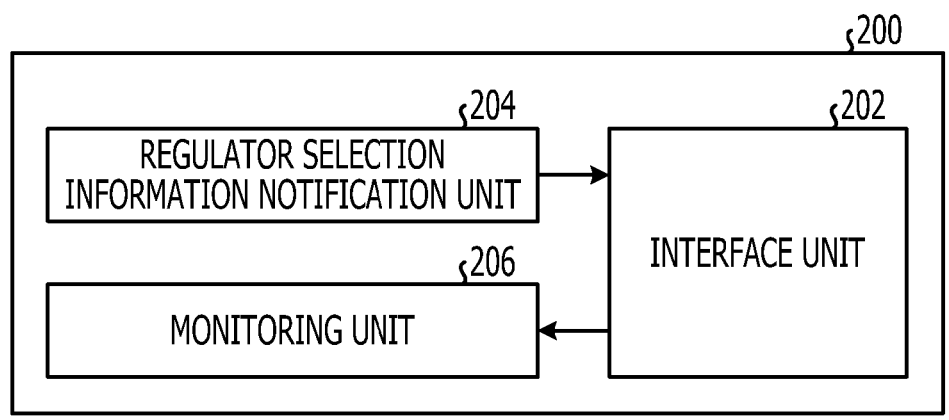
FIG. 5 is a chart illustrating a configuration of a host control unit.

Then, a description is given to a configuration of the host control unit in First Embodiment. FIG. 5 is a chart illustrating a configuration of a host control unit. As illustrated in FIG. 5, the host control unit 200 is provided with an interface unit 202, a regulator selection information notification unit 204, and a monitoring unit 206.

The interface unit 202 is connected to the interface unit 144 of the controller IC 140 to carry out data input/output process to and from the interface unit 144. For example, the interface unit 202 reads out the conversion efficiency characteristic information stored in the memory 142 via the interface unit 144. The interface unit 202 also sends an instruction signal to select a regulator to carry out an output to the load 300 and a regulator to carry out an output to the dummy load 400 via the interface unit 144 to the controller IC 140.

The regulator selection information notification unit 204 sends an instruction signal to select a regulator to carry out an output to the load 300 and a regulator to carry out an output to the dummy load 400 via the interface units 202 and 144 to the controller IC 140.

The monitoring unit 206 is a processing unit to let a user monitor the conversion efficiency characteristic information read out via the interface unit 202 by displaying it on, for example, a display unit.

Figure 6:
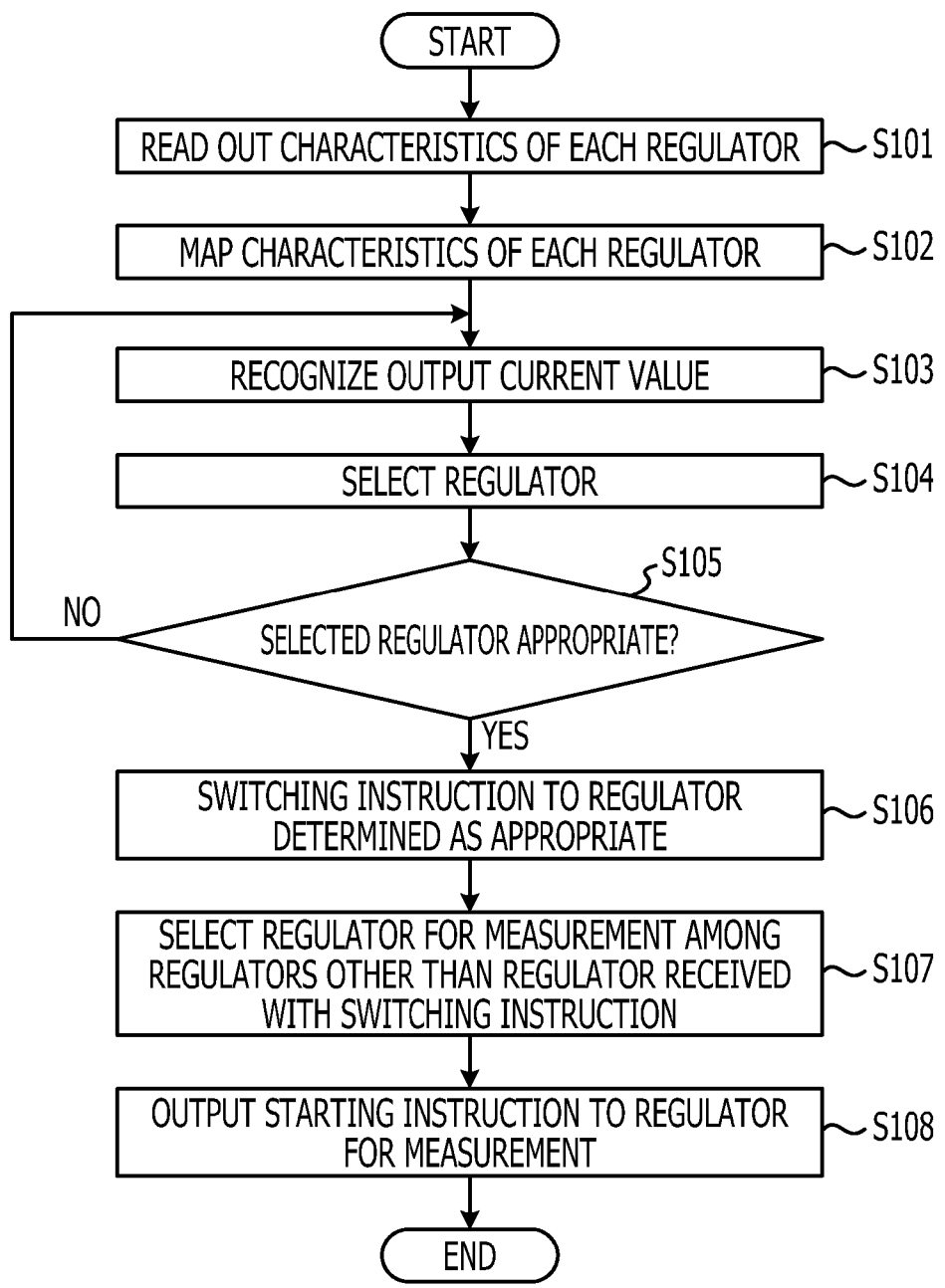
FIG. 6 is a flowchart of output switching process of the regulator device.

Then, a description is given to details of the output switching process of the regulator device 100. FIG. 6 is a flowchart of output switching process of the regulator device. As indicated in FIG. 6, the control unit 146 firstly reads out the characteristics (characteristics of the power conversion efficiency) of each of the regulators 110A, 110B, and 110C from the memory 142 (step S101).

Subsequently, the control unit 146 maps the characteristics of each of the regulators 110A, 110B, and 110C thus read out (step S102). Subsequently, the control unit 146 recognizes an output current value flowing to the load 300 detected by the ammeter 156 (step S103).

The control unit 146 selects a regulator with highest power conversion efficiency at the output current value among the regulators 110A, 110B, and 110C (step S104). Subsequently, the control unit 146 determines whether or not the regulator thus selected is appropriate (step S105). When determining the regulator thus selected as inappropriate (No in step S105), the control unit 146 goes back to step S103. This is to go back to step S103 without carrying out switching, when, for example, the regulator carrying out an output to the load 300 in the present state is selected, as the switching of the regulators does not have to be carried out.

In contrast, when determining the regulator thus selected as appropriate (Yes in step S105), the control unit 146 carries out an instruction to switch to the regulator determined as appropriate (step S106). This is to carry out switching to the regulator thus selected when, for example, a regulator other than the regulator carrying out an output to the load 300 in a present state is selected. In this case, the control unit 146 sends a switching signal indicating switching to the regulator thus selected to the regulator carrying out an output to the load 300 in the present state and the regulator thus selected via the interface unit 144. The regulator carrying out an output to the load 300 in the present state stops an output to the load 300 upon receiving the switching signal. Meanwhile, the regulator thus selected starts an output to the load 300 upon receiving the switching signal.

Subsequently, the control unit 146 selects a regulator to carry out measurement by carrying out an output to the dummy load 400 among the regulators other than the regulator carrying out an output to the load 300 by receiving the switching signal (step S107). Then, an instruction is carried out to start an output to the dummy load 400 to the regulator thus selected (step S108).

For example, the control unit 146 sends a measurement instruction signal indicating to carry out an output to the dummy load 400 and measure the characteristics of the power conversion efficiency via the interface unit 144 to the regulator thus selected in step S107. Upon receiving the measurement instruction signal, the regulator thus selected in step S107 starts an output to the dummy load 400 and also measures the characteristics of the power conversion efficiency corresponding to a change in output current to the dummy load 400.

For example, it is assumed that the regulator 110A is selected as the regulator for output to carry out an output to the load 300 and the regulator 110B is selected as the regulator for measurement to carry out an output to the dummy load 400 by the control unit 146. In this case, the switching unit of the regulator 110A switches an output destination of the voltage converted by the regulator 110A to the first output terminal 112 (Vout1) to supply a power to the load 300. The switching unit of the regulator 110B switches an output destination of the voltage converted by the regulator 110B to the second output terminal 114 (Vout2) to supply a power to the dummy load 400. The switching unit of the regulator 110C makes the voltage converted by the regulator 110C not to be outputted from either the first output terminal 112 (Vout1) or the second output terminal 114 (Vout2).

Figure 7:
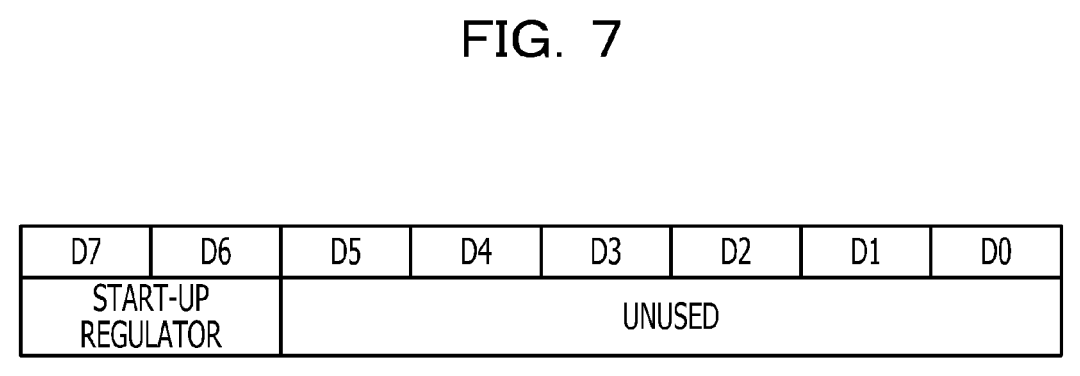
Figure 8:
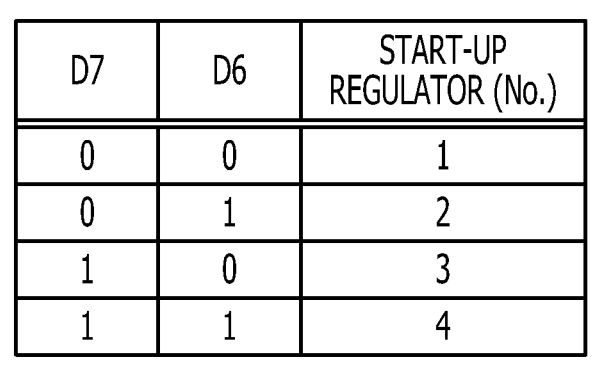

Then, a description is given to an example of a register configuration in the memory 142 of the regulator device 100 in First Embodiment. FIG. 7 is a chart illustrating an example of a register configuration. FIG. 8 is a chart illustrating an example of a register configuration of a start-up regulator.

As indicated in FIG. 7, the register in the memory 142 may be an 8-bit configuration of D0 through D7. For example, the registers D0 through D5 may be unused and the registers D6 and D7 may be the registers for setting the regulator to be used at the time of start-up.

For example, as indicated in FIG. 8, in a case of setting both registers D6 and D7 as "0", a regulator of a regulator No. "1" is set as the start-up regulator. Also as indicated in FIG. 8, in a case of setting the registers D6 as "1" and D7 as "0", a regulator of a regulator No. "2" is set as the start-up regulator. Also as indicated in FIG. 8, in a case of setting the registers D6 as "0" and D7 as "1", a regulator of a regulator No. "3" is set as the start-up regulator. Also as indicated in FIG. 8, in a case of setting both registers D6 and D7 as "1", a regulator of a regulator No. "4" is set as the start-up regulator.

The control unit 146 is difficult to carry out selection of the regulator based on the output current value because a current does not flow in the load 300 at the time of start-up of the wireless communication machine or the information processing machine. With that, the control unit 146 selects a preset regulator as the regulator to carry out an output to the load 300 at the time of start-up of the wireless communication machine or the information processing machine. More specifically, the control unit 146 reads the registers D6 and D7 in the memory 142 at the time of start-up of the wireless communication machine or the information processing machine to select a regulator in accordance with the values of the registers D6 and D7 as the regulator for start-up.

[Second Embodiment]

Then, a description is given to a regulator device 100 in Second Embodiment. The regulator device 100 in Second Embodiment is similar to the regulator device 100 in First Embodiment other than having a different register configuration in the memory 142 and process related to the register configuration. With that, only the parts different from First Embodiment are described and the rest of the configuration similar to First Embodiment is omitted from the description.

A description is given to a register configuration in the memory 142 of the regulator device 100 in Second Embodiment. FIG. 9 is a chart illustrating an example of a register configuration. FIG. 10 is a chart illustrating an example of a configuration of an output current register. FIG. 11 is a chart illustrating an example of register configurations of selection/measurement regulators. FIG. 12 is a chart illustrating an example of register configurations of selection efficiency/measurement efficiency.

As indicated in FIG. 9, the register in the memory 142 may also be a 24-bit configuration of D0 through D23. For example, the registers D0 through D5 may be measurement efficiency registers to store the power conversion efficiency of the regulator and the registers D6 and D7 may be measurement regulator registers to set a regulator to carry out measurement of the power conversion efficiency. The registers D8 through D13 may be selection efficiency registers to store the power conversion efficiency of the regulator carrying out an output to the load 300, and the registers D14 and D15 may be selected regulator registers to set the regulator carrying out an output to the load 300. The registers D16 through D19 may be registers to set the output current, and the registers D20 through D23 may be unused.

For example, as indicated in FIG. 10, the output current register is configured with four bits of D16 through D19 and, for example, the output current may be set per 1 (A) from 0 (A) to 15 (A). The output current may also be set, for example, per 5 (A) from 0 (A) to 75 (A) not limited to be set per 1 (A).

As indicated in FIG. 11, the registers of the selection/measurement regulators are configured with two bits of D14/D6 and D15/D7. For example, in a case of setting both registers D6 and D7 as "0", a regulator of a regulator No. "1" is set as the measurement regulator. Also in a case of setting both registers D14 and D15 as "0", a regulator of a regulator No. "1" is set as the selected regulator.

As indicated in FIG. 12, the registers of the selection efficiency/measurement efficiency are configured with six bits of registers D8/D0 through D13/D5 and, for example, may be set per 1% up to 37% in terms of the maximum efficiency (maximum power conversion efficiency) as 100%. The power conversion efficiency may also be set, for example, per 1.5% up to 5.5% in terms of the maximum efficiency as 100% not limited to be set per 1%.

For example, in a case of setting the register D16 of the output current register indicated in FIG. 10 as "1" and setting the registers D17 through D19 as "0", the output current becomes 1 (A). In this case, in the registers D0 through D15 indicated in FIGS. 11 and 12, the power conversion efficiency of the measurement regulator, the power conversion efficiency of the selected regulator, and the like in a case of the output current of 1 (A) are stored. Thus, the registers D0 through D15 are equipped in 16 ways in accordance with the output current values in 16 ways (0 (A) through 15 (A)).

Figure 13:
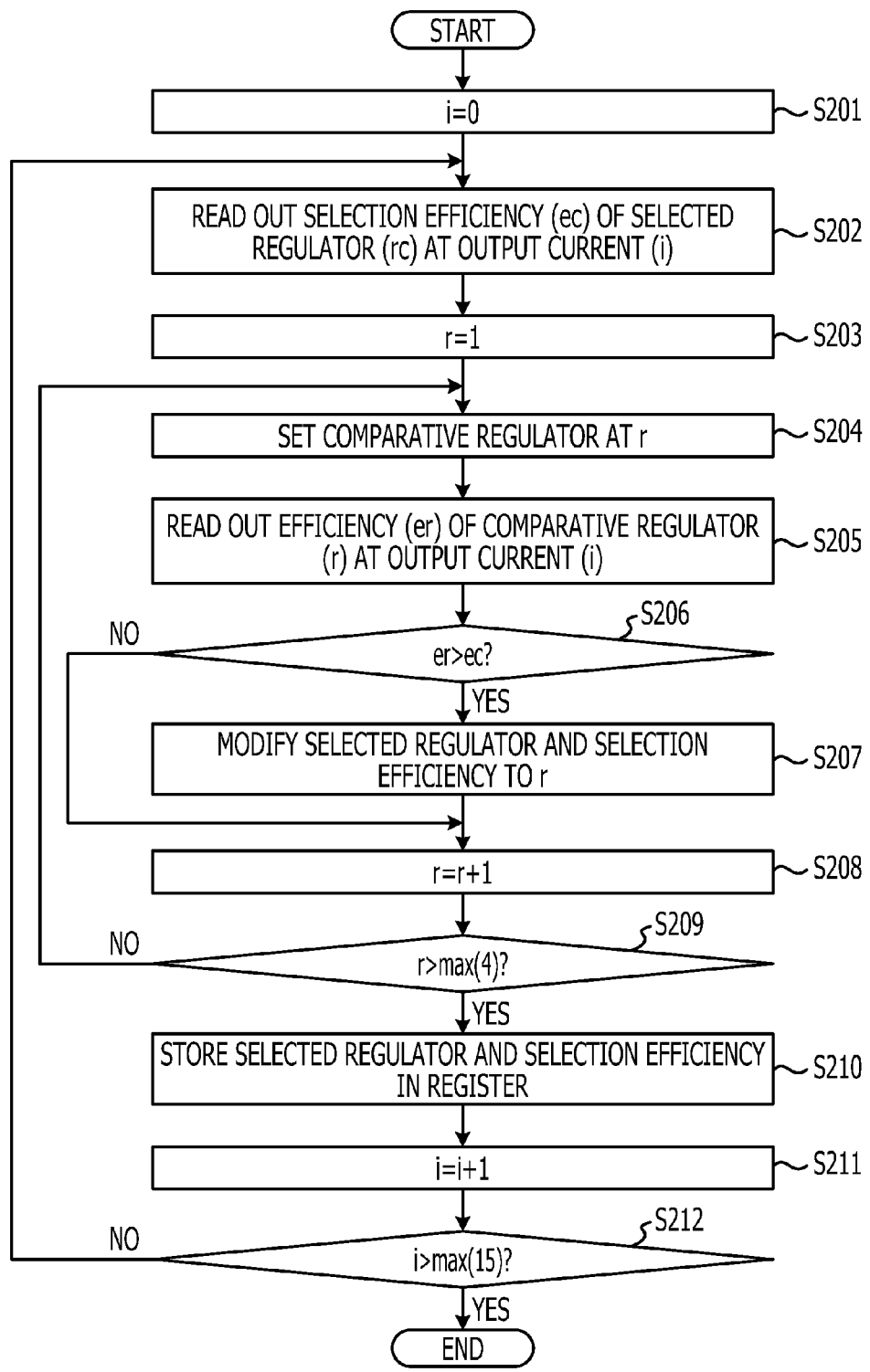
FIG. 13 is a flowchart of regulator selection process.

Then, a description is given to details of the regulator selection process by the control unit 146 in Second Embodiment. FIG. 13 is a flowchart of regulator selection process. The example of FIG. 13 indicates the regulator selection process in a case of four regulators.

As indicated in FIG. 13, the control unit 146 firstly initializes a parameter i of the output current as "0" to carry out the regulator selection process per output current value (step S201). Subsequently, the control unit 146 reads out the selection efficiency (power conversion efficiency: ec) of the selected regulator (rc) at the output current (i) (step S202). Then, the control unit 146 initializes the parameter r for a comparative regulator subjected to comparison with the selected regulator as "1" (step S203).

Subsequently, the control unit 146 sets the comparative regulator as r (step S204). Subsequently, the control unit 146 reads out the efficiency (power conversion efficiency: er) at the output current (i) of the comparative regulator (r) (step S205). Then, the control unit 146 determines whether or not the power conversion efficiency (er) is larger than the power conversion efficiency (ec) (step S206).

When determining as the power conversion efficiency (er) is larger than the power conversion efficiency (ec) (Yes in step S206), the control unit 146 modifies the selected regulator and the selection efficiency to r (step S207). That is, in a case of the power conversion efficiency of the comparative regulator higher than the power conversion efficiency of the selected regulator, the comparative regulator is defined as the selected regulator and the power conversion efficiency of the comparative regulator is defined as the power conversion efficiency of the selected regulator.

After step S207 or when determining as the power conversion efficiency (er) is not larger than the power conversion efficiency (ec) (No in step S206), the control unit 146 increments the parameter r (step S208). Subsequently, the control unit 146 determines whether or not the value of the parameter r is larger than 4, which is a maximum value (step S209).

When determining as the value of the parameter r is not larger than 4, which is the maximum value (No in step S209), the control unit 146 goes back to step S204 to repeat the process of step S204 through step S208.

In contrast, when determining as the value of the parameter r is larger than 4, which is a maximum value (Yes in step S209), the control unit 146 stores the selected regulator and the selection efficiency selected at that time in the register (step S210). That is, the control unit 146 stores the regulator with highest power conversion efficiency at the output current (i) among the four regulators and the power conversion efficiency of the regulator in the register.

Subsequently, the control unit 146 increments the parameter i (step S211). The control unit 146 determines whether or not the parameter i is larger than 15, which is a maximum value (step S212). The control unit 146 terminates the process when determining as the parameter i is larger than 15, which is the maximum value (Yes in step S212). In contrast, when determining as the parameter i is not larger than 15, which is the maximum value (No in step S212), the control unit 146 goes back to step S202 to repeat the process of step S202 through step S211. That is, the control unit 146 stores the regulator with highest power conversion efficiency per 1 (A) in a case of the output current of 0 (A) through 15 (A) and the power conversion efficiency of the regulator in the register.

[Third Embodiment]

Then, a description is given to a regulator device 100 in Third Embodiment. The regulator device 100 in Third Embodiment is similar to the regulator device 100 in First Embodiment other than having a different register configuration in the memory 142 and process related to the register configuration. With that, only the parts different from First Embodiment are described and the rest of the configuration similar to First Embodiment is omitted from the description.

A description is given to a register configuration in the memory 142 of the regulator device 100 in Third Embodiment. FIG. 14 is a chart illustrating an example of a register configuration. FIG. 15 is a chart illustrating an example of configurations of a temperature register.

As indicated in FIG. 14, the register in the memory 142 may be a 24-bit configuration of D0 through D23. Since the registers D0 through D19 are similar to the register configuration example described in FIG. 9, they are omitted from the description. The registers D20 through D23 may be temperature registers to store the temperature of the regulator.

For example, as indicated in FIG. 15, the temperature register is configured with four bits of D20 through D23 and, for example, the temperature of the regulator may be set per 5 (° C.) from 10 (° C.) to 85 (° C.). The temperature may also be set, for example, per 10 (° C.) from 10 (° C.) to 160 (° C.) not limited to be set per 5 (° C.).

For example, in a case of setting the register D16 of the output current register indicated in FIG. 14 as "1" and setting the registers D17 through D19 as "0", the output current becomes 1 (A). Also in a case of setting the register D20 of the temperature register indicated in FIG. 15 as "1" and setting the registers D21 through D23 as "0", the temperature of the regulator becomes 15 (° C.). In this case, in the registers D0 through D15 indicated in FIG. 14, the power conversion efficiency of the measurement regulator in a case of the output current of 1 (A) and the temperature of the regulator at 15 (° C.), the power conversion efficiency of the selected regulator, and the like are stored. Thus, the registers D0 through D15 are equipped in 256 ways in accordance with the output current values in 16 ways (0 (A) through 15 (A)) and the temperatures of the regulator in 16 ways (10 (° C.) through 85 (° C.)).

In this case, the control unit 146 selects the regulator to carry out an output to the load 300 based on the current value outputted from the first power output terminal 104, the temperatures of the regulators 110A, 110B, and 110C, and the register information (conversion efficiency characteristic information) stored in the memory 142. That is, since a regulator generally has power conversion efficiency changed by the temperature, the control unit 146 selects the regulator with highest power conversion efficiency at the output current value to the load 300 and at the temperature of the regulator as the regulator for output to the load 300.

[Fourth Embodiment]

Then, a description is given to a regulator device 100 in Fourth Embodiment. The regulator device 100 in Fourth Embodiment is similar to the regulator device 100 in First Embodiment other than having a different register configuration in the memory 142 and process related to the register configuration. With that, only the parts different from First Embodiment are described and the rest of the configuration similar to First Embodiment is omitted from the description.

A description is given to a register configuration in the memory 142 of the regulator device 100 in Fourth Embodiment. FIG. 16 is a chart illustrating an example of a register configuration. FIG. 17 is a chart illustrating an example of configurations of an average operating temperature register.

As indicated in FIG. 16, the register in the memory 142 may be a 16-bit configuration of D24 through D39. The registers D24 through D31 may be operating time registers indicating an operating time of the regulator. The registers D32 through D35 may also be average operating temperature registers indicating an average operating temperature of the regulator. D36 through D39 may be unused.

For example, the operating time register is configured with eight bits of the registers D24 through D31 and the operating time of the regulator may be set in 256 ways. As indicated in FIG. 17, the average temperature register is configured with four bits of D32 through D35 and, for example, the average operating temperature of the regulator may be set per 5 (° C.) from 10 (° C.) to 85 (° C.). The temperature may also be set, for example, per 10 (° C.) from 10 (° C.) to 160 (° C.) not limited to be set per 5 (° C.).

Figure 18:
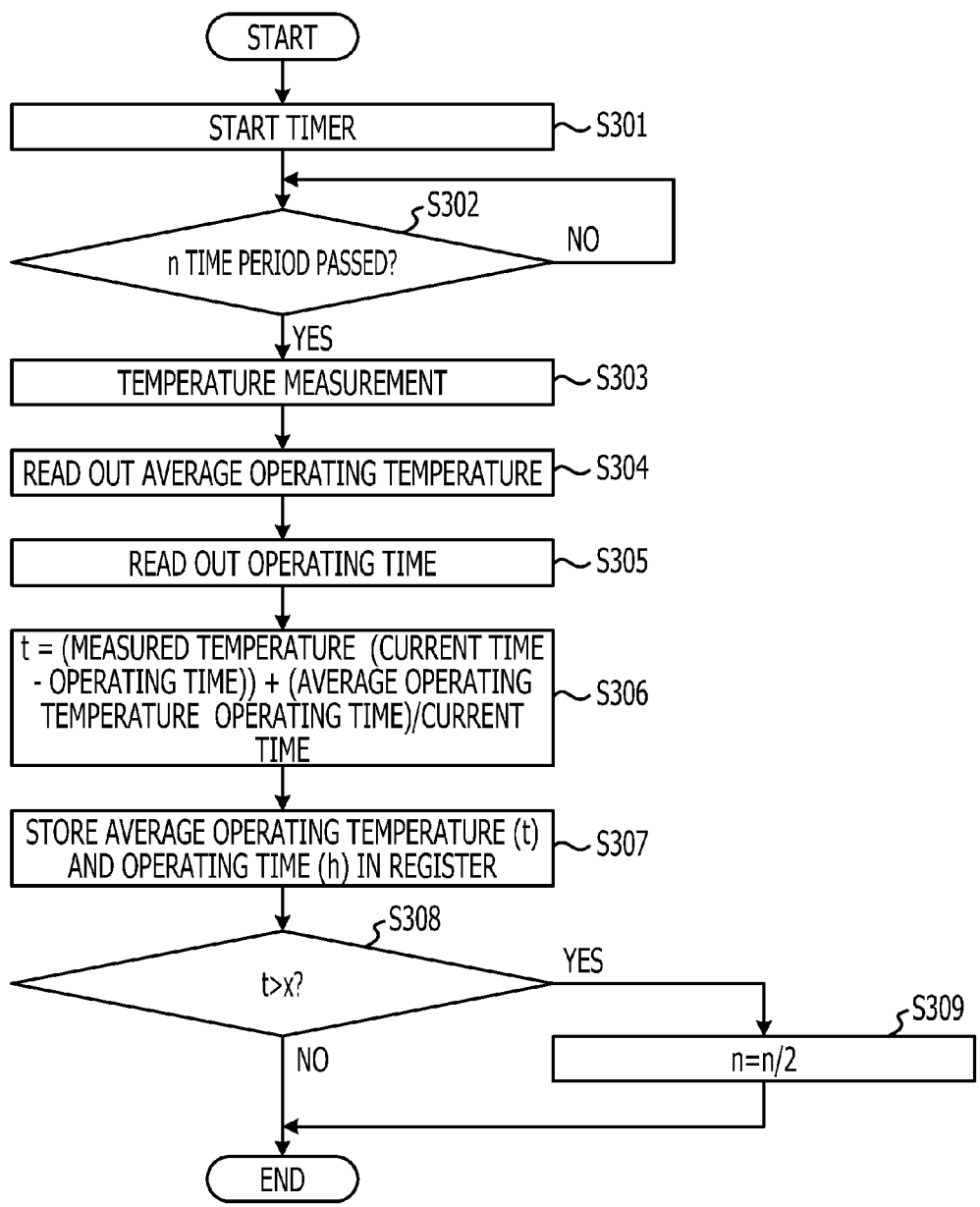
FIG. 18 is a flowchart of process of measuring an average operating temperature.
Figure 19:
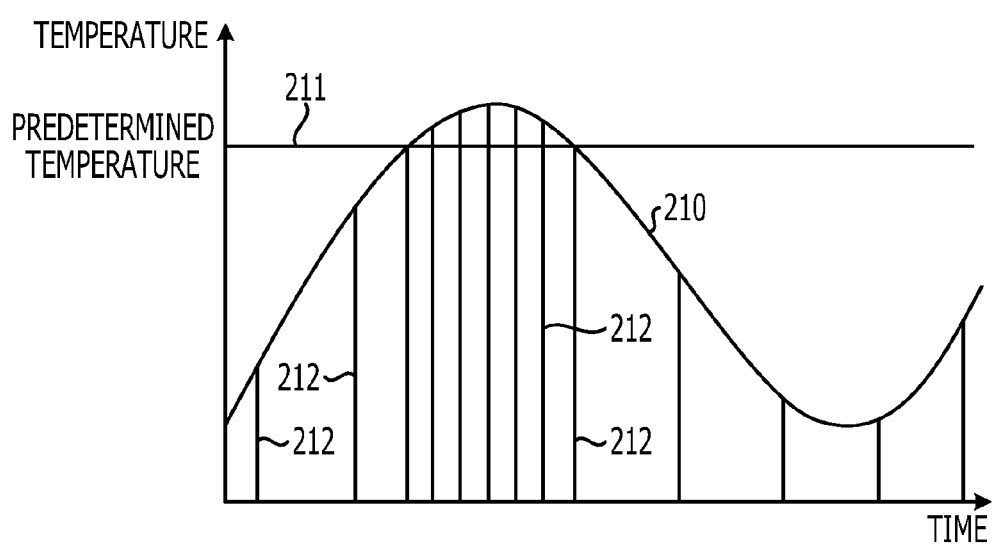
FIG. 19 is a chart illustrating a modification of temperature measurement intervals.

Then, a description is given to process of measuring an average operating temperature of the regulator of a control unit 146 in Fourth Embodiment. FIG. 18 is a flowchart of process of measuring an average operating temperature. FIG. 19 is a chart illustrating a modification of temperature measurement intervals.

As indicated in FIG. 18, the control unit 146 firstly starts a timer (step S301). Subsequently, the control unit 146 determines whether or not an n time period, which is an interval to carry out temperature measurement, has passed since the timer is started (step S302).

When determining as the n time period has not passed since the timer is started (No in step S302), the control unit 146 goes back to step S302. In contrast, when determining as the n time period has passed since the timer is started (Yes in step S302), the control unit 146 measures the temperature of the regulator (step S303). Subsequently, the control unit 146 reads out the average operating temperature from the average temperature register in the memory 142 (step S304). Subsequently, the control unit 146 reads out the operating time of the regulator from the operating time register in the memory 142 (step S305).

Subsequently, the control unit 146 obtains a parameter t related to the average operating temperature by the following equation (step S306).

$$t = (\text{Measured temperature} \times (\text{Current time} - \text{Operating time})) + (\text{Average operating temperature} \times \text{Operating time})/\text{Current time}$$

In this equation, Current time=Operating time+n. Subsequently, the control unit 146 stores the average operating temperature (t) obtained in step S306 and the operating time (h) of the current regulator in the register (step S307). Subsequently, the control unit 146 determines whether or not the average operating temperature (t) obtained in step S306 exceeds a preset predetermined temperature (x) (step S308).

When determining as the average operating temperature (t) obtained in step S306 exceeds the preset predetermined temperature (x) (Yes in step S308), the control unit 146 sets the n, which is an interval to carry out temperature measurement, as ½ (step S309) to terminate the process. That is, the interval to carry out temperature measurement is shortened. While an example of setting the n, which is an interval to carry out temperature measurement, as ½ is represented here, it is not limited to this and may be, for example, ⅓ or the like as long as the interval to carry out temperature measurement is shortened.

In contrast, when determining as the average operating temperature (t) obtained in step S306 does not exceed the preset predetermined temperature (x) (No in step S308), the control unit 146 terminates the process.

FIG. 19 is a chart illustrating a modification of temperature measurement intervals, where the abscissa represents the time course and the ordinate represents the average operating temperature of the regulator. In FIG. 19, a graph 210 is a graph illustrating a transition of the average operating temperature of the regulator and a temperature 211 is a preset predetermined temperature. Also in FIG. 19, lines 212 represent timings to carry out temperature measurement of the regulator. As illustrated in FIG. 19, when the graph 210 illustrating the transition of the average operating temperature of the regulator becomes larger than the preset predetermined temperature 211, the control unit 146 shortens the interval to carry out temperature measurement (interval between each line 212 and the next).

[Fifth Embodiment]

Then, a description is given to a regulator device 100 in Fifth Embodiment. The regulator device 100 in Fifth Embodiment is similar to the regulator device 100 in First Embodiment other than carrying out switching process of a regulator based on a switching signal of a regulator received from a host control unit 200. With that, only the parts different from First Embodiment are described and the rest of the configuration similar to First Embodiment is omitted from the description.

Figure 20:
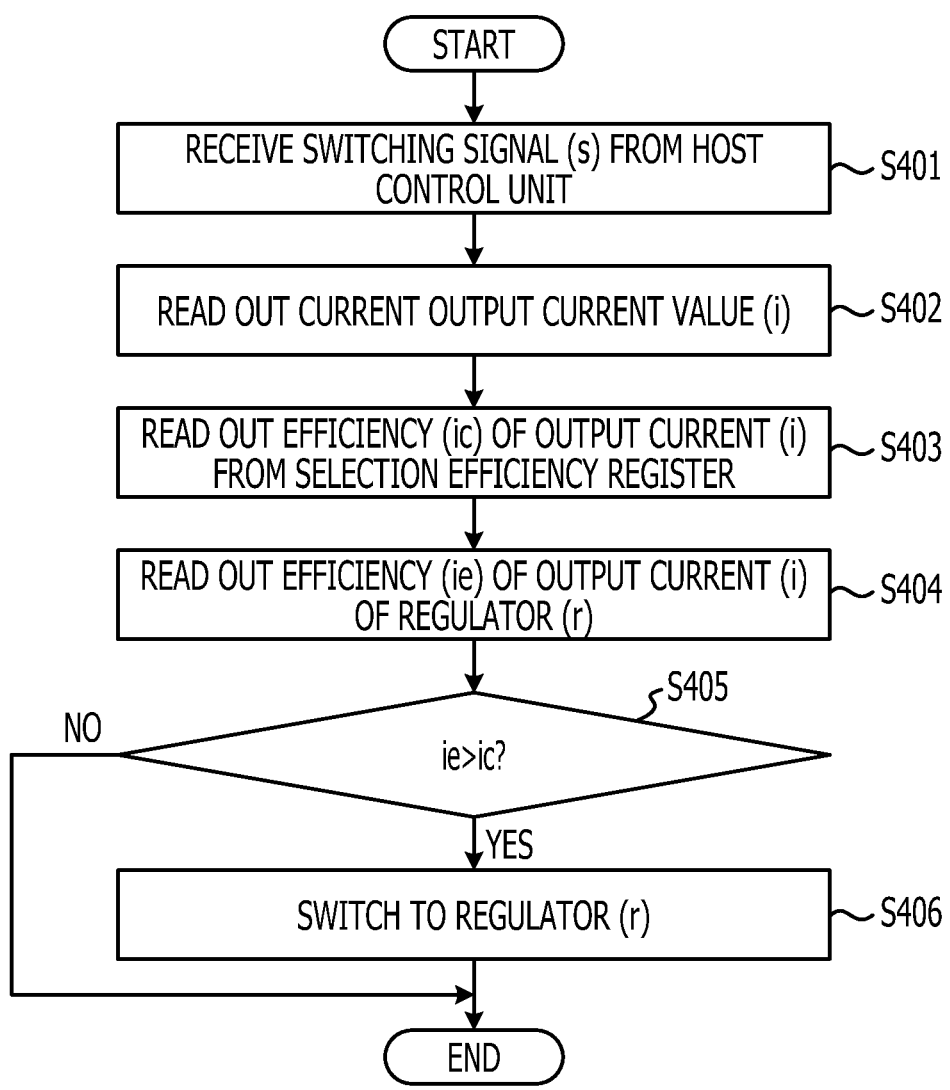
FIG. 20 is a flowchart of regulator switching determination process.

A description is given to the regulator switching determination process when receiving a switching signal of the regulator from the host control unit 200 in the regulator device 100 in Fifth Embodiment. FIG. 20 is a flowchart of regulator switching determination process.

The control unit 146 firstly receives a switching signal (s) sent from the host control unit 200 (step S401). Subsequently, the control unit 146 reads out a current output current value (i) metered by the ammeter 156 (step S402).

Subsequently, the control unit 146 reads out power conversion efficiency (ic) at the output current value (i) from the selection efficiency register (step S403). Subsequently, the control unit 146 reads out power conversion efficiency (ie) at the output current value (i) of the regulator (r) specified by the switching signal (s) (step S404).

The control unit 146 determines whether or not the power conversion efficiency (ie) is larger than the power conversion efficiency (ic) (step S405). When determining as the power conversion efficiency (ie) is larger than the power conversion efficiency (ic) (Yes in step S405), the control unit 146 switches the regulator to carry out an output to the load 300 to the regulator (r) specified by the switching signal (s) (step S406) to terminate the process. In contrast, when determining as the power conversion efficiency (ie) is not larger than the power conversion efficiency (ic) (No in step S405), the control unit 146 does not carry out the switching of the regulator to directly terminate the process.

That is, upon receiving the switching signal (s), the control unit 146 compares the power conversion efficiency of the regulator carrying out an output to the load 300 with the power conversion efficiency of the regulator specified by the switching signal (s) at the current load current. Then, in a case that the power conversion efficiency of the regulator specified by the switching signal (s) is higher, the control unit 146 switches the regulator to carry out an output to the load 300 to the regulator specified by the switching signal (s).

While an example of comparing the power conversion efficiency of the regulator carrying out an output to the load 300 with the power conversion efficiency of the regulator specified by the switching signal (s) is represented, it is not limited to this. For example, upon receiving the switching signal (s), the control unit 146 may also switch the regulator to carry out an output to the load 300 forcibly to the regulator specified by the switching signal (s).

[Sixth Embodiment]

Then, a description is given to a regulator device 100 in Sixth Embodiment. The regulator device 100 in Sixth Embodiment is similar to the regulator device 100 in First Embodiment other than having a different register configuration in the memory 142 and process related to the register configuration. With that, only the parts different from First Embodiment are described and the rest of the configuration similar to First Embodiment is omitted from the description.

A description is given to a register configuration in the memory 142 of the regulator device 100 in Sixth Embodiment. FIG. 21 is a chart illustrating an example of a register configuration. FIG. 22 is a chart illustrating an example of a configuration of warning registers.

As indicated in FIG. 21, the register in the memory 142 may also be an 8-bit configuration of D0 through D7. For example, the registers D0 through D3 may be unused. The registers D4 through D7 may be warning registers to set an abnormal regulator with power conversion efficiency less than a preset lower limit value.

For example, as indicated in FIG. 22, the warning registers are configured with four bits of D4 through D7 and, for example, which regulator is the abnormal regulator (which regulator has the power conversion efficiency less than the lower limit value) among four regulators may be set. For example, in a case of setting all of the registers D4 through D7 as "0", it is considered that there is no abnormal regulator. Also for example, in a case of setting the register D4 as "1" and setting the registers D5 through D7 as "0", it is found that the regulator of the regulator No. "1" is the abnormal regulator.

Figure 23:
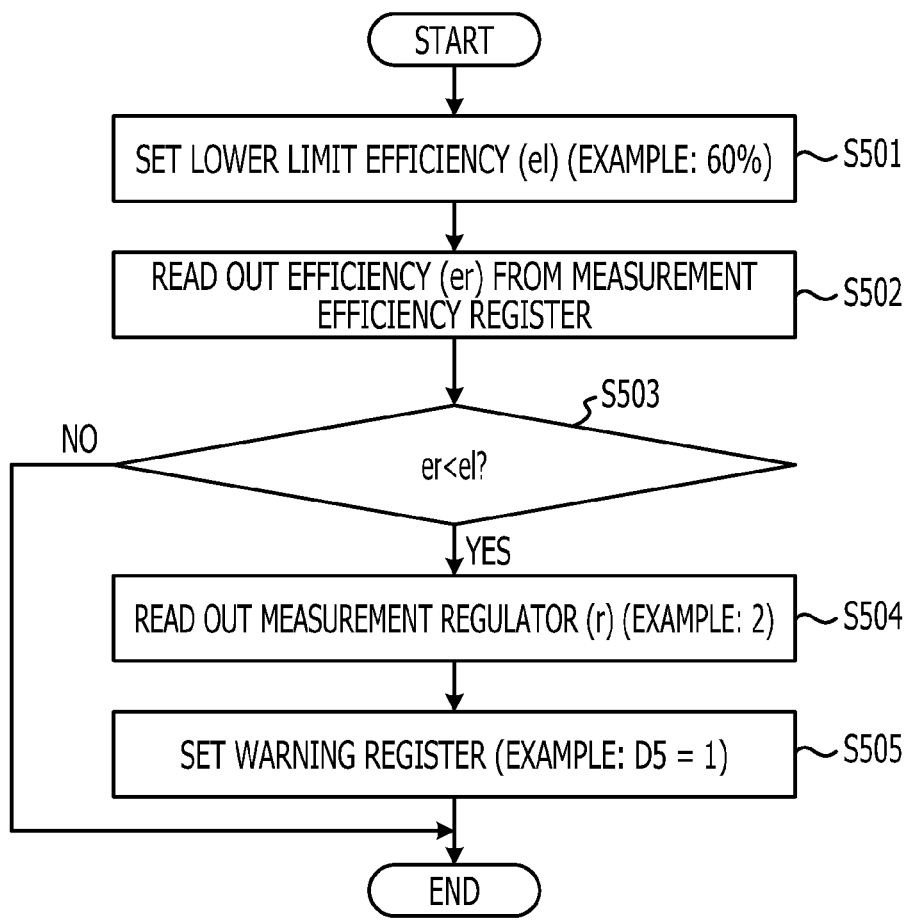
FIG. 23 is a flowchart of efficiency monitoring process.

Then, a description is given to details of the process to set the warning registers by monitoring the power conversion efficiency of the regulator. FIG. 23 is a flowchart of efficiency monitoring process.

As indicated in FIG. 23, the control unit 146 firstly sets lower limit efficiency (el) as, for example, 60% (step S501). Subsequently, the control unit 146 reads out power conversion efficiency (er) of the regulator from the measurement efficiency register (step S502). Subsequently, the control unit 146 determines whether or not the power conversion efficiency (er) is less than the lower limit efficiency (el) (step S503).

When determining as the power conversion efficiency (er) is less than the lower limit efficiency (el) (Yes in step S503), the control unit 146 reads out a measurement regulator (r) (step S504). For example, it is assumed that the control unit 146 reads out the regulator of the regulator No. "2" as the measurement regulator (r).

The control unit 146 sets the warning register based on the measurement regulator (r) thus read out (step S505) to terminate the process. For example, in a case of reading out the regulator of the regulator No. "2", the control unit 146 sets the register D5 as "1". That is, a regulator with power conversion efficiency (er) less than the lower limit efficiency (el) is considered as an abnormal regulator with poor power conversion efficiency due to aging deterioration or the like to be registered in the warning register accordingly.

In contrast, when determining as the power conversion efficiency (er) is not less than the lower limit efficiency (el) (No in step S503), the control unit 146 considers it as not an abnormal regulator to terminate the process.

Figure 24:
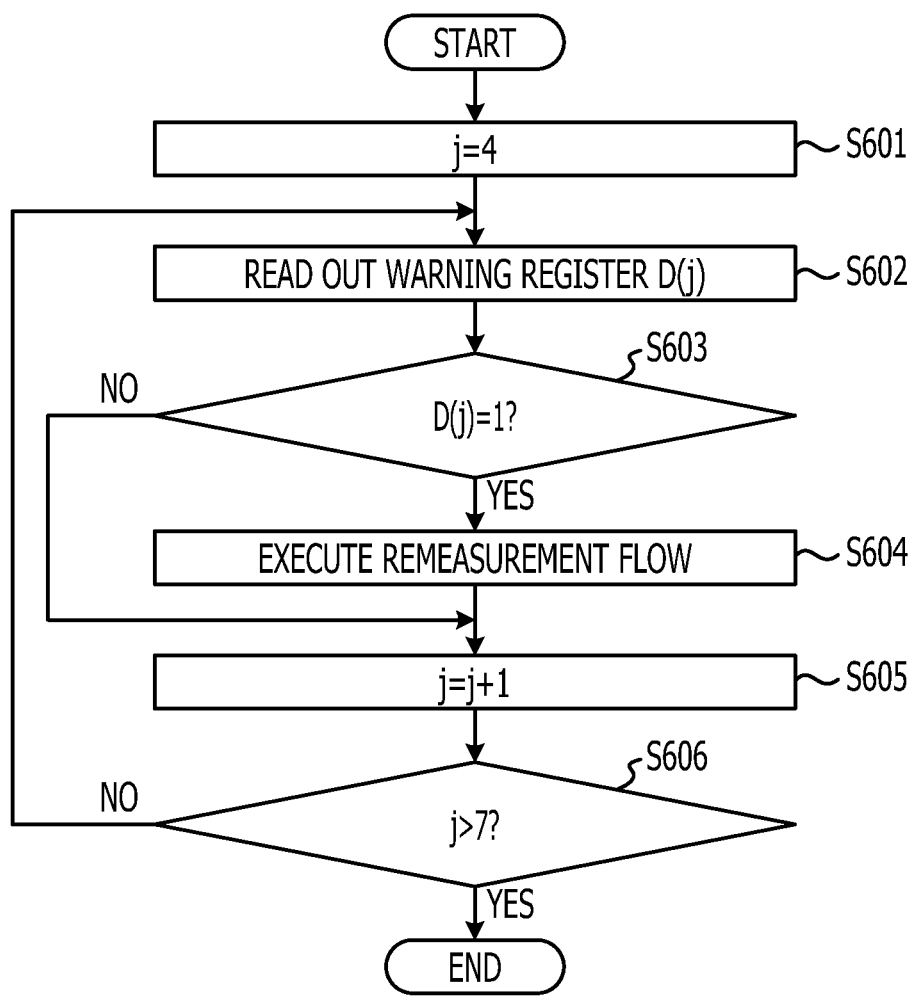
FIG. 24 is a flowchart of abnormal regulator determination process.

Then, a description is given to the process to carry out determination of whether or not it is an abnormal regulator based on the warning register. FIG. 24 is a flowchart of abnormal regulator determination process.

As indicated in FIG. 24, the control unit 146 initializes a parameter j to search the warning register as 4 (step S601). Subsequently, the control unit 146 reads out a warning register D(j) (step S602).

Subsequently, the control unit 146 determines whether or not D(j) is "1" (step S603). When determining D(j) as "1" (Yes in step S603), the control unit 146 executes a remeasurement flow (step S604). The remeasurement flow is described later using FIG. 25.

After step S604 or when determining D(j) as not "1" (No in step S603), the control unit 146 increments the parameter j (step S605). Subsequently, the control unit 146 determines whether or not the parameter j is larger than 7 (step S606).

When determining as the parameter j is larger than 7 (Yes in step S606), the control unit 146 terminates the process. In contrast, when determining as the parameter j is not larger than 7 (No in step S606), the control unit 146 goes back to step S602 to repeat the process of step S602 through step S605.

Figure 25:
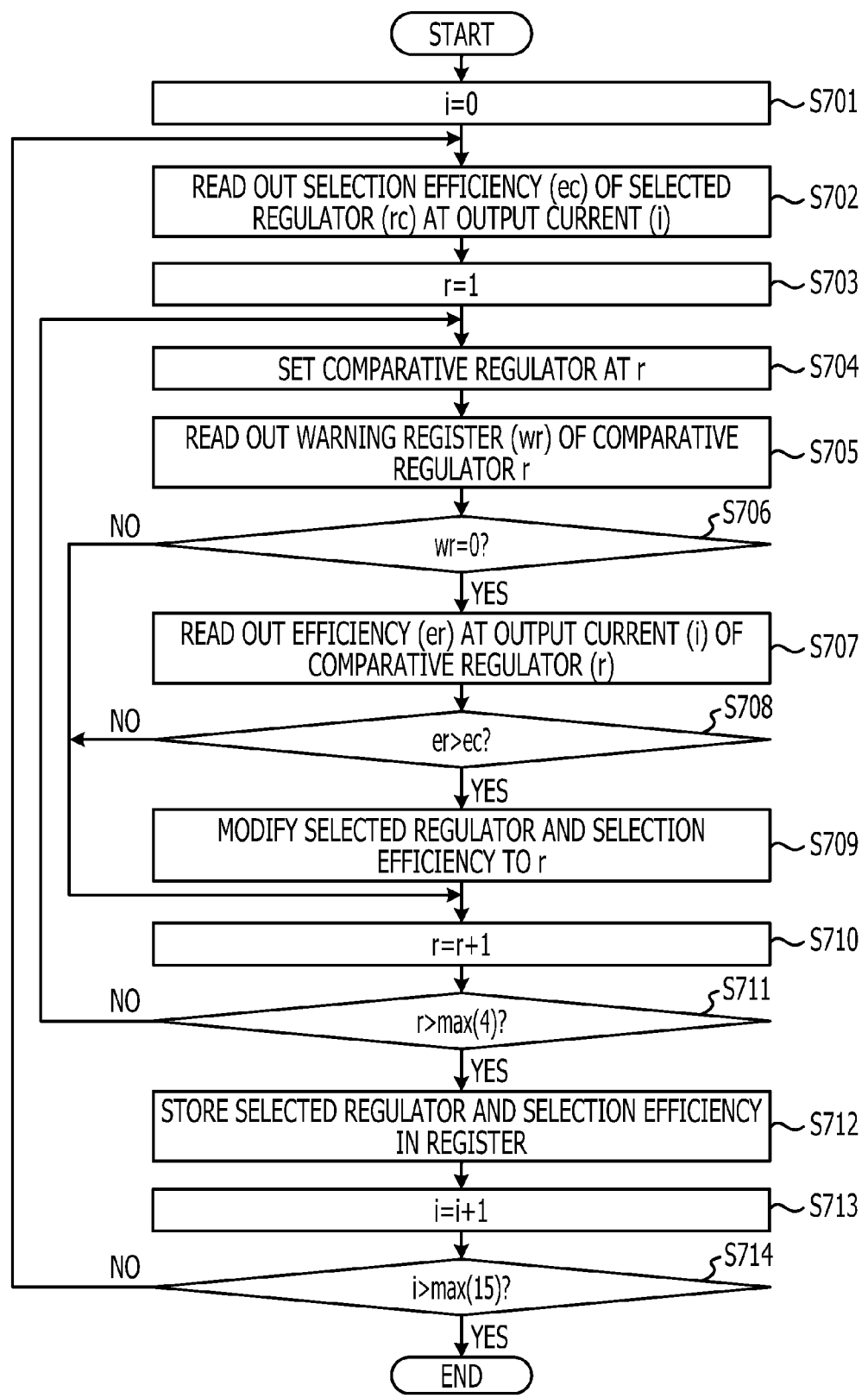
FIG. 25 is a flowchart of regulator remeasurement process.

Then, a description is given to details of the regulator remeasurement process. FIG. 25 is a flowchart of regulator remeasurement process.

As indicated in FIG. 25, the control unit 146 firstly initializes the parameter i of the output current as "0" to carry out the regulator remeasurement process for each output current value (step S701). Subsequently, the control unit 146 reads out the selection efficiency (power conversion efficiency: ec) of the selected regulator (rc) at the output current (i) (step S702). Then, the control unit 146 initializes the parameter r for a comparative regulator subjected to comparison with the selected regulator as "1" (step S703).

Subsequently, the control unit 146 sets a comparative regulator as r (step S704). Subsequently, the control unit 146 reads out a warning register (wr) of the comparative regulator r (step S705). Subsequently, the control unit 146 determines whether or not a value of the warning register (wr) is "0" (step S706).

When determining the value of the warning register (wr) as "0" (Yes in step S706), the control unit 146 reads out the efficiency (power conversion efficiency: er) at the output current (i) of the comparative regulator (r) (step S707). Then, the control unit 146 determines whether or not the power conversion efficiency (er) is larger than power conversion efficiency (ec) (step S708).

When determining as the power conversion efficiency (er) is larger than the power conversion efficiency (ec) (Yes in step S708), the control unit 146 modifies the selected regulator and the selection efficiency to r (in step S709). That is, in a case that the power conversion efficiency of the comparative regulator is higher than the power conversion efficiency of the selected regulator, the comparative regulator is defined as the selected regulator and the power conversion efficiency of the comparative regulator is defined as the power conversion efficiency of the selected regulator.

When determining as the value of the warning register (wr) is not "0" after step S709 (No in step S706) or when determining as the power conversion efficiency (er) is not larger than the power conversion efficiency (ec) (No in step S708), the control unit 146 increments the parameter r (step S710). Subsequently, the control unit 146 determines whether or not the value of the parameter r is larger than 4, which is a maximum value (step S711).

When determining as the value of the parameter r is not larger than 4, which is a maximum value (No in step S711), the control unit 146 goes back to step S704 to repeat the process of step S704 through step S710.

In contrast, when determining as the value of the parameter r is larger than 4, which is a maximum value (Yes in step S711), the control unit 146 stores the selected regulator selected at that time and the selection efficiency in the register (step S712). That is, the control unit 146 stores the regulator with highest power conversion efficiency at the output current (i) among the four regulators and the power conversion efficiency of the regulator in the register.

Subsequently, the control unit 146 increments the parameter i (step S713). The control unit 146 determines whether or not the parameter i is larger than 15, which is a maximum value (step S714). When determining as the parameter i is larger than 15, which is a maximum value (Yes in step S714), the control unit 146 terminates the process. In contrast, when determining as the parameter i is not larger than 15, which is a maximum value (No in step S714), the control unit 146 goes back to step S702 to repeat the process of step S702 through step S713.

[Seventh Embodiment]

Then, a description is given to a regulator device 100 in Seventh Embodiment. The regulator device 100 in Seventh Embodiment is similar to the regulator device 100 in First Embodiment other than having a different register configuration in the memory 142 and process related to the register configuration. With that, only the parts different from First Embodiment are described and the rest of the configuration similar to First Embodiment is omitted from the description.

Figure 26:
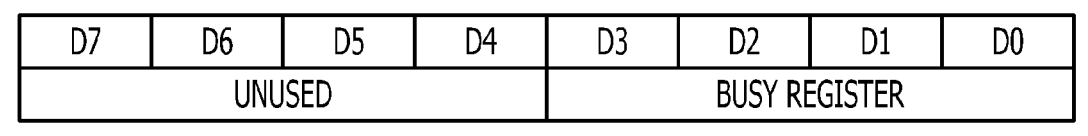

A description is given to a register configuration in the memory 142 of the regulator device 100 in Seventh Embodiment. FIG. 26 is a chart illustrating an example of a register configuration. FIG. 27 is a chart illustrating an example of a configuration of BUSY registers.

As indicated in FIG. 26, the register in the memory 142 may also be an 8-bit configuration of D0 through D7. For example, the registers D0 through D3 may be BUSY registers to set a regulator under measurement of the power conversion efficiency. The registers D4 through D7 may be unused.

For example, as indicated in FIG. 27, the BUSY register is configured with four bits of D0 through D3 and, for example, which regulator to be the BUSY regulator (which regulator is under measurement of the power conversion efficiency) among four regulators may be set. For example, in a case of setting all of the registers D0 through D3 as "0", it is considered that there is no BUSY regulator. Also for example, in a case of setting the register D0 as "1" and setting the registers D1 through D3 as "0", it is found that the regulator of the regulator No. "1" is the BUSY regulator.

Figure 28:
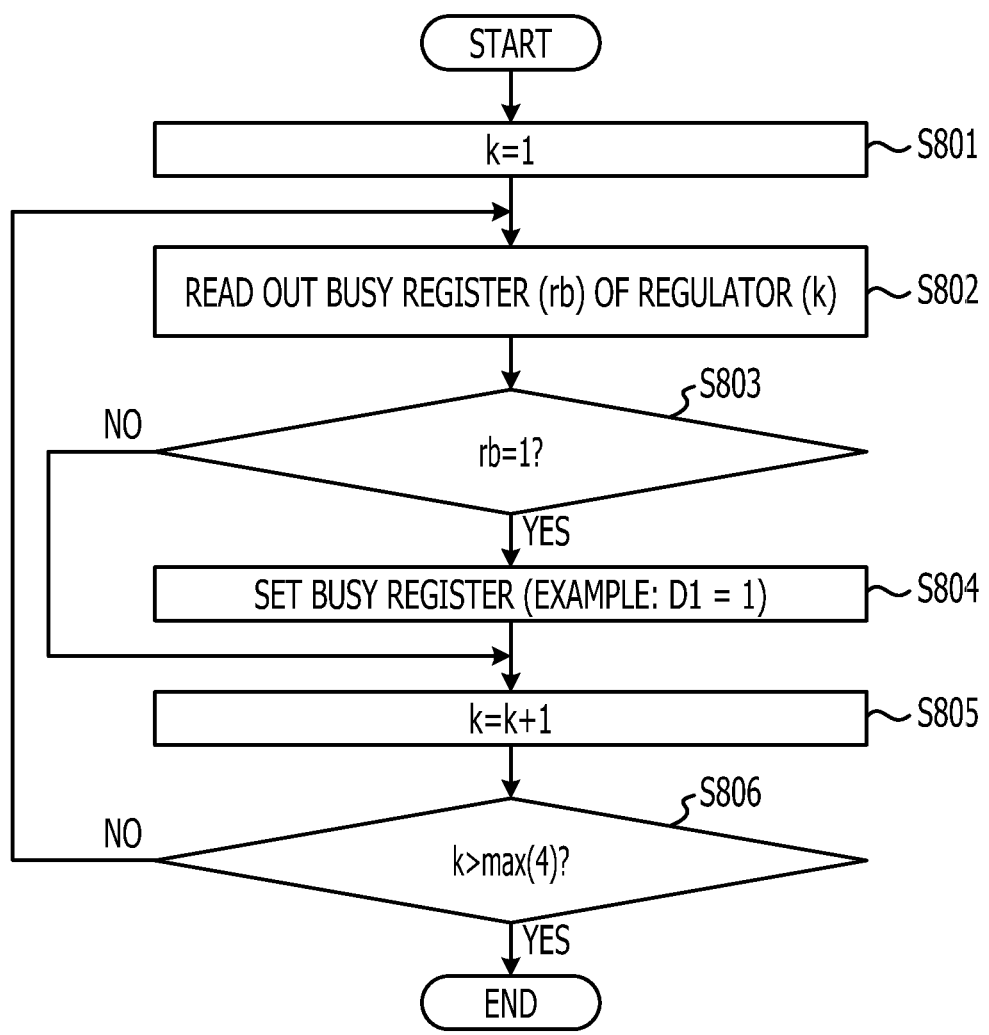
FIG. 28 is a flowchart of BUSY determination process.

Then, a description is given to the process to set a BUSY register. FIG. 28 is a flowchart of BUSY determination process. As indicated in FIG. 28, the control unit 146 firstly initializes a parameter k to carry out BUSY determination process for the four regulators as "1" (step S801).

Subsequently, the control unit 146 reads out a BUSY register (rb) of a regulator (k) (step S802). Subsequently, the control unit 146 determines whether or not a value of the BUSY register (rb) thus read out is "1" (step S803).

When determining the value of the BUSY register (rb) as "1" (Yes in step S803), the control unit 146 sets the BUSY register in the controller IC 140 (step S804). For example, when determining the value of the BUSY register (rb) as "1" for the regulator of the regulator No. "1", D1 of the BUSY register in the controller IC 140 is set as "1".

After step S804 or when determining the value of the BUSY register (rb) not as "1" (No in step S803), the control unit 146 increments the parameter k (step S805). Subsequently, the control unit 146 determines whether or not the value of the parameter k is larger than 4, which is a maximum value (step S806).

When determining as the value of the parameter k is larger than 4, which is a maximum value (Yes in step S806), the control unit 146 terminates the process. In contrast, when determining as the value of the parameter k is not larger than 4, which is a maximum value (No in step S806), the control unit 146 goes back to step S802 to repeat the process of step S802 through step S805. This process enables the controller IC 140 to hold BUSY information of the connected regulator.

Figure 29:
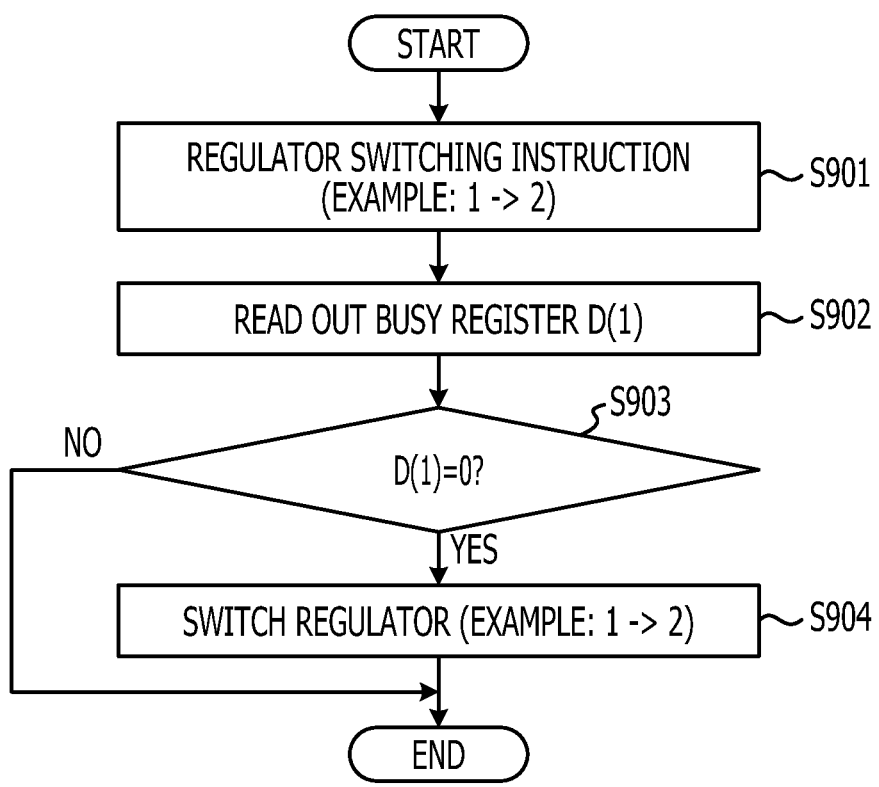
FIG. 29 is a flowchart of process of determining a regulator stop.

Then, a description is given to the determination process of whether or not to stop a regulator. FIG. 29 is a flowchart of process of determining a regulator stop. FIG. 29 indicates an example of a case that the control unit 146 carries out a switch instruction from the regulator of the regulator No. "1" to the regulator of the regulator No. "2".

As indicated in FIG. 29, the control unit 146 firstly carries out a switching instruction of the regulator (step S901). Subsequently, the control unit 146 reads out the BUSY register D(1) (step S902). Subsequently, the control unit 146 determines whether or not the value of the BUSY register D(1) is "0" (step S903).

When determining the value of the BUSY register D(1) as "0" (Yes in step S903), the control unit 146 executes switching from the regulator of the regulator No. "1" to the regulator of the regulator No. "2" (step S904).

In contrast, when determining the value of the BUSY register D(1) not as "0" (No in step S903), the regulator of the regulator No. "2" is BUSY, that is, it is under measurement of the power conversion efficiency, so that the control unit 146 directly terminates the process.

[Eighth Embodiment]

Then, a description is given to a regulator device 100 in Eighth Embodiment. The regulator device 100 in Eighth Embodiment is similar to the regulator device 100 in First Embodiment other than carrying out switching process of a regulator using an internal clock counter. With that, only the parts different from First Embodiment are described and the rest of the configuration similar to First Embodiment is omitted from the description.

Figure 30:
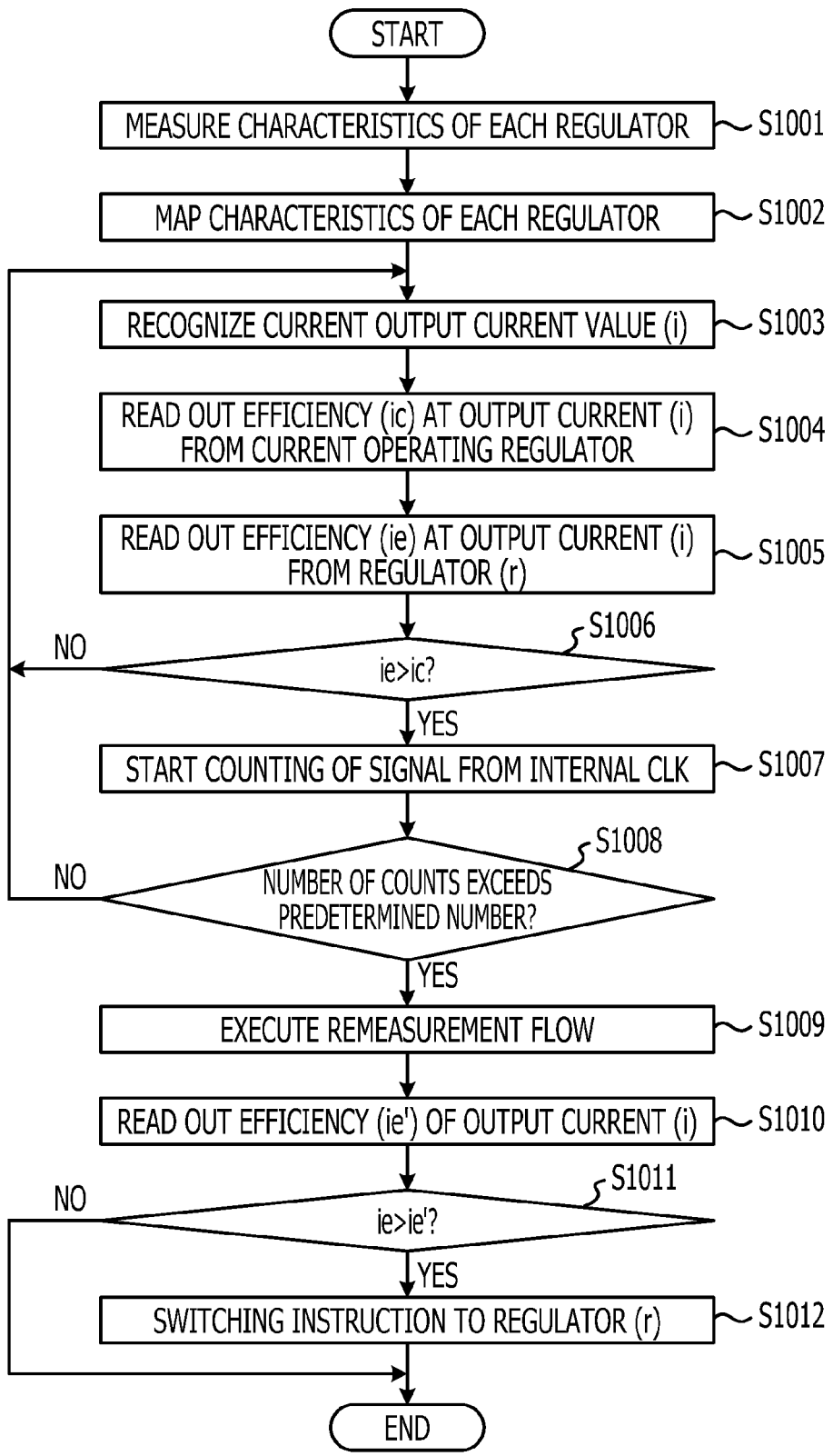
FIG. 30 is a flowchart of switching process using an internal clock counter.

A description is given to switching process of a regulator of the regulator device 100 in Eighth Embodiment. FIG. 30 is a flowchart of switching process using an internal clock counter.

As indicated in FIG. 30, the control unit 146 firstly measures the characteristics of the power conversion efficiency of the regulators 110A, 110B, and 110C (step S1001). In other words, the control unit 146 selects a regulator with highest power conversion efficiency relative to the output current flowing to the load 300 among the regulators 110A, 110B, and 110C as the regulator for output to the load 300. For example, it is assumed that the regulator 110A is selected as the regulator for output. In this case, the control unit 146 selects a regulator to measure the characteristics of the power conversion efficiency using the dummy load 400 among the regulators (regulators 110B and 110C) other than the regulator for output (regulator 110A). For example, it is assumed that the regulator 110B is selected as the regulator for measurement.

The control unit 146 causes the impedance of the dummy load 400 to be variable to change the current outputted from the regulator 110B, while measuring the characteristics of the power conversion efficiency to store the conversion efficiency characteristic information in the memory 113 of the regulator 110B. Then, the control unit 146 reads out the conversion efficiency characteristic information stored in the memory 113 to store it in the memory 142.

For example, as the measurement of the characteristics of the power conversion efficiency of the regulator 110B is finished, measurement of the characteristics of the power conversion efficiency of the regulator 110C is also carried out similarly.

After that, when the regulator for output is switched to the regulator 110B or 110C, the regulator 110A is selected as the regulator for measurement to also carry out measurement of the characteristics of the power conversion efficiency of the regulator 110A similarly. In such a manner, the control unit 146 measures the characteristics of the power conversion efficiency of the regulators 110A, 110B, and 110C.

Subsequently, the control unit 146 maps the characteristics of the power conversion efficiency of the regulators 110A, 110B, and 110C (step S1002). Subsequently, the control unit 146 recognizes a current output current value (i), that is, a current value (i) detected by the ammeter 156 (step S1003).

Subsequently, the control unit 146 reads out the power conversion efficiency (ic) corresponding to the output current (i) out of the currently operating regulators (step S1004). The control unit 146 reads out the power conversion efficiency (ie) corresponding to the output current value (i) from a regulator (r) subjected to comparison (step S1005).

The control unit 146 determines whether or not the power conversion efficiency (ie) is larger than the power conversion efficiency (ic) (step S1006). When determining as the power conversion efficiency (ie) is not larger than the power conversion efficiency (ic) (No in step S1006), the control unit 146 goes back to step S1003 to repeat the process of step S1003 through step S1005.

In contrast, when determining as the power conversion efficiency (ie) is larger than the power conversion efficiency (ic) (Yes in step S1006), the control unit 146 starts counting of a signal from an internal CLK (clock) (step S1007).

Subsequently, the control unit 146 determines whether or not a number of counts exceeds a preset predetermined number (step S1008). When determining as the number of counts does not exceed the preset predetermined number (No in step S1008), the control unit 146 goes back to step S1003 to repeat the process of step S1003 through step S1007.

In contrast, when determining as the number of counts exceeds the preset predetermined number (Yes in step S1008), the control unit 146 executes a remeasurement flow (step S1009). This remeasurement flow is similar to that described in FIG. 25, so that it is omitted from the description.

Subsequently, the control unit 146 reads out power conversion efficiency (ie') corresponding to the output current value (i) after carrying out the remeasurement of the regulator (r) (step S1010). Subsequently, the control unit 146 determines whether or not the power conversion efficiency (ie) is larger than the power conversion efficiency (ie') (step S1011).

When determining as the power conversion efficiency (ie) is larger than the power conversion efficiency (ie') (Yes in step S1011), the control unit 146 switches the regulator for output to the regulator (r) (step S1012). In contrast, when determining as the power conversion efficiency (ie) is not larger than the power conversion efficiency (ie') (No in step S1011), the control unit 146 terminates the process directly.

As just explained, the control unit 146 does not carry out switching immediately in a case that the power conversion efficiency of the regulator subjected to comparison is higher than the power conversion efficiency of the currently operating regulator, but carries out switching only in a case that the clock count of the internal clock exceeds a predetermined threshold. Accordingly, it is possible to suppress switching of a regulator following, for example, a sudden change in current/voltage due to an inrush current or the like.

[Ninth Embodiment]

Then, a description is given to a regulator device 100 in Ninth Embodiment. The regulator device 100 in Ninth Embodiment is similar to the regulator device 100 in First Embodiment other than carrying out processing using a PM-Bus command. With that, only the parts different from First Embodiment are described and the rest of the configuration similar to First Embodiment is omitted from the description.

A description is given to the process using a PM-Bus command of the regulator device 100 in Ninth Embodiment. FIG. 31 is a chart illustrating an example of PM-Bus commands. As indicated in FIG. 31, the controller IC 140 may instruct measurement of power conversion efficiency of a regulator by, for example, using a command of a command code as "ACh" and a command name as "EFFICIENCY_Measurement".

The controller IC 140 may also instruct readout of power conversion efficiency of a regulator by using a command of, as indicated in FIG. 31, a command code as "ADh" and a command name as "READ_EFFICIENCY".

Figure 32:
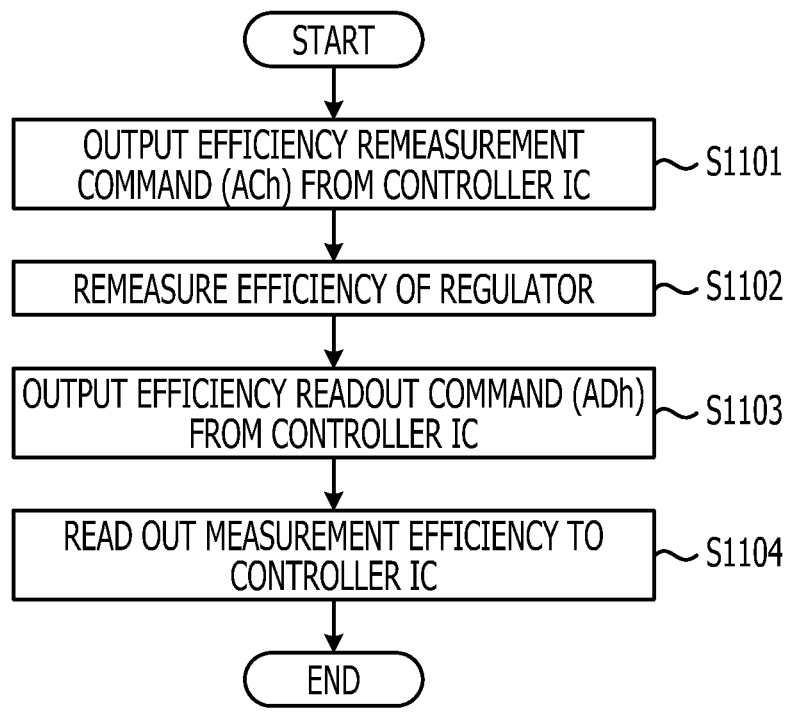
FIG. 32 is a flowchart of efficiency readout process using PM-Bus commands.

FIG. 32 is a flowchart of efficiency readout process using PM-Bus commands. As indicated in FIG. 32, the control unit 146 outputs a remeasurement command (ACh) of the power conversion efficiency from the controller IC 140 to each regulator (step S1101).

Subsequently, upon receiving the remeasurement command (ACh) outputted from the controller IC 140, each regulator carries out remeasurement of the power conversion efficiency in accordance with the remeasurement command (ACh) (step S1102).

Subsequently, the control unit 146 outputs a readout command (ADh) of the power conversion efficiency from the controller IC 140 to each regulator (step S1103). The control unit 146 outputs the readout command (ADh), and then reads out the power conversion efficiency from each regulator (step S1104) to terminate the process.

As just explained, the control unit 146 may control the measurement and readout of the power conversion efficiency using commands of the PM-Bus interface connecting the controller IC 140 with each regulator.

The PM-Bus commands to be used by the control unit 146 are not limited to the remeasurement command (ACh) and the readout command (ADh). FIG. 33 is a chart illustrating an example of PM-Bus commands. FIG. 34 is a chart illustrating an example of PM-Bus commands.

The control unit 146 may instruct readout of the output current of a regulator using a command of, as indicated in FIG. 33, a command code as "8Ch" and a command name as "READ_IOUT". The control unit 146 may also instruct readout of the input current of a regulator using a command of, as indicated in FIG. 33, a command code as "89h" and a command name as "READ_IIN".

The control unit 146 may also instruct readout of the output voltage of a regulator using a command of, as indicated in FIG. 34, a command code as "96h" and a command name as "READ_POUT". The control unit 146 may also instruct readout of the input voltage of a regulator using a command of, as indicated in FIG. 34, a command code as "97h" and a command name as "READ_PIN".

Then, the control unit 146 may calculate power conversion efficiency of a regulator by reading out the input/output currents and the input/output voltages of a regulator and using the input/output currents and the input/output voltages thus read out.

As described above, the regulator device in each embodiment above selects a regulator with highest power conversion efficiency relative to the output current value among the plurality of regulators as the regulator for output to the machine load. Accordingly, it is possible to achieve a high efficiency regulator operation at any time from a low load current time to a high load current time. Therefore, it is possible to improve the reliability of the machine having the regulator device mounted therein and also possible to suppress a thermal loss because the regulator device operates in high efficiency at any time.

The regulator device in each embodiment above is equipped with a dummy load circuit for measurement of the power conversion efficiency of the plurality of regulators, and while carrying out an output to the machine load from a certain regulator, it may carry out measurement of the characteristics of the power conversion efficiency of another regulator using the dummy load circuit. Accordingly, it is possible to carry out both a machine operation of a regulator to supply a power and measurement of the characteristics of the power conversion efficiency of a regulator. In other words, even while operating a machine having a regulator device mounted therein, the characteristics of the power conversion efficiency of the plurality of regulators may be measured on time for update. It is also possible to periodically capture the characteristics of the power conversion efficiency going through aging (aging deterioration) of each regulator, so that it is possible to select an optimum regulator in accordance with the aging.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A regulator device comprising:
   a plurality of regulators that are equipped in parallel between a power input terminal and a power output terminal and converts a power inputted from the power input terminal to output to the power output terminal, the plurality of regulators each including a conversion efficiency measurement circuit to measure a characteristic of the power conversion efficiency relative to an output current;
   a dummy load circuit that is coupled to a power output system different from a power output system to the respective power output terminal of the plurality of regulators;
   a memory that stores conversion efficiency characteristic information of the plurality of regulators, the conversion efficiency characteristic information representing a characteristic of power conversion efficiency relative to a current flowing; and
   a controller that reads out the conversion efficiency characteristic information from the memory and selects one of the plurality of regulators to carry out an output to the power output terminal and one of the plurality of regulators to carry out an output to the dummy load circuit among the plurality of regulators.

2. The regulator device according to claim 1, wherein the controller selects the regulator to carry out an output to the power output terminal among the plurality of regulators based on a current value outputted from the power output terminal and the conversion efficiency characteristic information stored in the memory, and selects the regulator to carry out an output to the dummy load circuit among regulators other than the regulator thus selected.

3. The regulator device according to claim 1, wherein the plurality of regulators respectively include a first output terminal that is coupled to the power output terminal, a second output terminal that is coupled to the dummy load circuit, and a switching circuit that switches turning on and off of an output from the first output terminal and the second output terminal, and the controller selects the regulator to carry out an output to the power output terminal and the regulator to carry out an output to the dummy load circuit among the plurality of regulators by controlling the switching circuit for the plurality of regulators.

4. The regulator device according to claim 1, wherein the controller selects a regulator that is set in advance for a time of start-up among the plurality of regulators as the regulator to carry out an output to the power output terminal at the time of start-up of the regulator device.

5. The regulator device according to claim 2, wherein the memory stores the conversion efficiency characteristic information relative to a regulator temperature for the plurality of regulators, and the controller selects the regulator to carry out an output to the power output terminal among the plurality of regulators based on the current value outputted from the power output terminal, the temperature of the plurality of regulators, and the conversion efficiency characteristic information stored in the memory.

6. The regulator device according to claim 5, wherein the controller shortens an interval to measure the temperature of the plurality of regulators when an average temperature of the plurality of regulators becomes larger than a preset threshold.

7. The regulator device according to claim 2, further comprising:
   an interface that reads out the conversion efficiency characteristic information stored in the memory from an external device.

8. The regulator device according to claim 7, wherein the interface receives an instruction signal that is outputted from the external device, selects the regulator to carry out an output to the power output terminal among the plurality of regulators, and selects the regulator to carry out an output to the dummy load circuit among regulators other than the regulator thus selected, and the controller selects the regulator to carry out an output to the power output terminal among the plurality of regulators in accordance with the instruction signal received by the interface, and selects the regulator to carry out an output to the dummy load circuit among regulators other than the regulator thus selected.

9. The regulator device according to claim 7, wherein the interface receives an instruction signal that is outputted from the external device, selects the regulator to carry out an output to the power output terminal among the plurality of regulators, and selects the regulator to carry out an output to the dummy load circuit among regulators other than the regulator thus selected, and the controller selects the regulator to carry out an output to the power output terminal among the plurality of regulators based on the instruction signal received by the interface, the current value outputted from the power output terminal, and the conversion efficiency characteristic information stored in the memory, and selects the regulator to carry out an output to the dummy load circuit among regulators other than the regulator thus selected.

10. The regulator device according to claim 1, wherein the controller stops an operation of a regulator that has the power conversion efficiency relative to an output current to the dummy load circuit less than a preset threshold among the plurality of regulators.

11. The regulator device according to claim 2, wherein the memory stores busy information that specifies a regulator under measurement of the characteristic of the power conversion efficiency using the dummy load circuit, and the controller selects the regulator to carry out an output to the power output terminal among regulators other than the regulator under measurement of the characteristic of the power conversion efficiency using the dummy load circuit based on the busy information stored in the memory.

12. The regulator device according to claim 2, wherein the controller selects another regulator as the regulator to carry out an output to the power output terminal in a case that a status of power conversion efficiency of the other regulator larger than the power conversion efficiency of the regulator to carry out an output to the power output terminal continues until an internal clock becomes larger than a preset number of counts.

* * * * *